United States Patent [19]
Katsuyama et al.

[11] Patent Number: 5,191,612
[45] Date of Patent: Mar. 2, 1993

[54] CHARACTER RECOGNITION SYSTEM

[75] Inventors: Yutaka Katsuyama; Noriyuki Fukuyama, both of Tokyo, Japan

[73] Assignee: Fujitsu Limited, Kawasaki, Japan

[21] Appl. No.: 668,541

[22] Filed: Mar. 13, 1991

[30] Foreign Application Priority Data

Mar. 13, 1990 [JP] Japan .................................. 2-61603
Aug. 31, 1990 [JP] Japan ................................ 2-228422
Oct. 20, 1990 [JP] Japan ................................ 2-282633

[51] Int. Cl.⁵ ............................................... G06K 9/34
[52] U.S. Cl. ......................................... 382/9; 382/61; 358/462
[58] Field of Search .................. 382/9, 61, 24, 16, 18; 358/462, 464, 467

[56] References Cited

U.S. PATENT DOCUMENTS

| | | | |
|---|---|---|---|
| 4,292,622 | 9/1981 | Henrichon, Jr. | 382/9 |
| 4,377,803 | 3/1983 | Lotspiech et al. | 382/9 |
| 4,589,144 | 5/1986 | Namba | 382/9 |
| 4,949,392 | 8/1990 | Barski et al. | 382/61 |
| 5,048,107 | 9/1991 | Tachikawa | 382/9 |
| 5,075,895 | 12/1991 | Bessho | 358/462 |

Primary Examiner—Leo H. Boudreau
Assistant Examiner—David Fox

[57] ABSTRACT

A character recognition device includes a ruled line extracting unit supplied with image information to be recognized and operated for extracting ruled line coordinates from the image information, a character recognizing unit for recognizing characters from the region excluding frame lines extracted by the ruled line extracting unit, and a recognition result outputting unit for outputting character codes together with ruled line codes from the results obtained by the ruled line extracting unit and the character recognizing unit.

5 Claims, 27 Drawing Sheets x : INDICATES OPTIONAL CHARACTERS

| a b c | 1  5 | あい<br>うえ<br>おか | |
|-------|------|------|------|
| 1 2 | 1 3 5 7 9 | | W X Y Z |

CHARACTER RECOGNITION SYSTEM

BACKGROUND OF THE INVENTION

This invention relates to a character reader for recognizing printed characters, and more specifically to a system for recognizing printed characters from images including ruled lines and then generating character codes, and to a system for forming tables by controlling positions and types of ruled lines forming them.

Recently, with advances in computers and databases, various kinds of character recognition systems have been realized which utilize an image reader to read printed characters, recognize them as characters and symbols thereof, and then encode them for storing in a memory.

With such a system, the position of a ruled line may be erroneously recognized and the recognition results may be output without and adjustment, causing display misplacement or breaks in ruled lines or frame lines. This occurs because the number and width of characters are different in each row and column of the table. Therefore, a technology is required for recognizing ruled lines as well as characters. To meet this requirement, it is necessary to determine the position and type of a ruled line of a table according to the recognition result of characters and tables, and then to appropriately form a table by preventing misplaced frame lines, etc.

With the increasing world-wide use of word processors, most office work now involves preparation of documents with a lot of tables. In forming a large or complicated table, the operation of pre-setting the positions of vertical and horizontal frame lines is often troublesome to the operator. Therefore, it is preferable to complete a table by determining the number and size of items in it according to a series of inputted character codes and then automatically determining the positions of its vertical and horizontal lines.

DESCRIPTION OF THE RELATED ART

In some character recognition systems for recognizing characters and ruled lines, ruled line images are extracted first, and after the ruled line images have been eliminated from the screen, character images are extracted. With these systems, however, erroneous extraction of ruled lines may cause erroneous erasure from an original image. Therefore, the positions of ruled lines relative to characters must be controlled.

In other character recognition systems, ruled lines are extracted first, and then characters are extracted, avoiding the area of the ruled lines in an original image. With this method, characters are extracted either collectively in each strip enclosed in ruled lines, or from a whole original image without splitting. Where characters are collectively extracted in each strip, first the ruled lines are displayed and then the characters in each strip are extracted, recognized, and restored in the corresponding strip where the positions of ruled lines relative to characters must be controlled. Where characters are extracted from a whole original image without splitting, an image is displayed sequentially in rows, ruled lines are encoded according to the type of line, and recognized characters are encoded as characters.

Where ruled lines and characters are extracted from a whole image without splitting, the extracting operation is performed sequentially in rows. That is, first an image is scanned in rows, then characters are recognized separately from ruled lines which are encoded according to the type of line, and finally the characters are encoded by a recognition symbol. With this method, table formation is executed after the whole image is displayed, and the whole process can be performed faster than the method of extracting characters separately from ruled lines. This is because the pre-processing of ruled line recognition is not required.

Ruled line extracting methods utilize:

i) a method of extracting vertical line elements (primitives) from binary image data and combining them into a line, and ii) a method of splitting an image into vertical strips of binary image data to obtain a horizontal histogram, splitting an image into horizontal strips of binary image data to obtain a vertical histogram, detecting anticipated ruled lines in each strip, and determining the continuity according to the data of adjacent strips, thus forming a ruled line.

The above examples of prior art technology require a ruled line extractor for extracting ruled lines in addition to a character area extractor, and need to store the information of extracted ruled lines as coordinate values representing the original image. This causes the problem that the recognition device must be complicated.

An additional problem with the prior art technology is that the process takes longer to recognize the whole image because characters are recognized after ruled lines are extracted by a ruled line extractor.

In the prior technology, ruled lines are recognized as graphic data. Thus, there is a problem that the graphic data cannot be directly inputted to a word processor as normal character codes.

Therefore, the prior technology requires an application program to assign a corresponding character code for a ruled line when the technology is used with a word processor, etc.

The prior art also provides a table forming means based on the premise that a table comprises ruled lines of equal length in the vertical direction (hereinafter referred to as vertical ruled lines) and ruled lines of equal length in the horizontal direction (hereinafter referred to as horizontal ruled lines) in the form of a grid.

With this method, the recognition result for each row is checked to determine whether it contains a character code representing a horizontal ruled line. If it does not, it is then searched for a character code representing a vertical ruled line. Accordingly, the number of items in the vertical direction, the number of items in the horizontal direction (hereinafter referred to as columns), and the maximum width of each item are determined, thereby fixing the positions and sizes of vertical and horizontal ruled lines.

In this case, a table can be outputted in the form of a grid as shown in FIG. 1A. This grid is based on the recognition results indicating irregular positions of vertical ruled lines as shown in FIG. 1B. Where a part of a horizontal ruled line is broken during the recognizing operation, the missing part can be supplemented as described above, thereby restoring the original ruled line.

In the previously described prior art technology, a recognition result of a row containing a horizontal ruled line outputs a horizontal ruled line with the length corresponding to the width of a table. Accordingly, for the table shown in FIG. 1C, a recognition result of a row containing both characters and a ruled line will often form an erroneous table. Thus, the prior art technology has the problem that it can not form various kinds of complicated tables.

Some recent word processors have a function whereby a table is formed by selecting a format of desired rows and columns and inputting character codes in each column delimited appropriately with vertical ruled lines without pre-determining positions of vertical and horizontal ruled lines. However, these word-processors have to prepare a format for representing a configuration of a table.

After careful consideration of these problems, this invention has been developed to determine a configuration of a table according to inputted character code strings and successfully form tables with various configurations.

SUMMARY OF THE INVENTION

An object of the this invention is to speed up the recognizing operation by enabling concurrent extraction of the ruled line area and character line area by the same means, and to simplify the recognition system by representing ruled lines in character code and forming ruled lines after encoding the whole recognition result into character codes.

Another object of this invention is to provide a system for recognizing characters and ruled lines, and encoding both of them into character codes.

A further object of this invention is to improve character recognition speeds by contemporaneously extracting ruled line regions and character regions from an image of a document of characters mixed with ruled lines, at outputting, as a structural part of the document, the recognized ruled lines after being coded, and at correctly generating a structural part of a table.

A feature of this invention resides in a character recognition device comprising a ruled line extracting means, supplied with image information to be recognized, for extracting ruled line coordinates from said image information; a character recognizing means for recognizing characters from the region excluding ruled lines extracted by said ruled line extracting means; and a recognition result outputting means for outputting character codes together with ruled line codes from the results obtained by said ruled line extracting means and said character recognizing means.

A column processor supplements structural elements corresponding to respective columns depending on whether or not the respective structural elements contain horizontal ruled lines, and a ruled line processor reshapes the respective vertical ruled lines depending on the preceding or succeeding structural elements.

Hence, even a table containing a character mixed with a horizontal ruled line is reshaped properly, and the horizontal ruled lines included in the preceding and succeeding structural elements are connected to the vertical ruled lines indicating sections, so that the quality of a reshaped table is improved.

Since the ruled line processor supplements vertical frame lines until their numbers are equal to the column number indicated by the form information, a table whose column numbers differ for respective rows is reshaped. Even if a vertical ruled line being a part of a frame showing an outline of a table is not included in the recognition result, a table can be reshaped with vertical frame lines supplemented.

BRIEF DESCRIPTION OF THE DRAWINGS

FIG. 5 is an explanatory view for specifying the range of the layout image;

FIG. 12 shows an example of a result of the one-row-forming process;

FIG. 13 is a view showing an example of an outputted recognition result;

FIG. 14 is a view showing an example of an outputted ruled line formation;

DESCRIPTION OF THE PREFERRED EMBODIMENTS

Figure 1A:
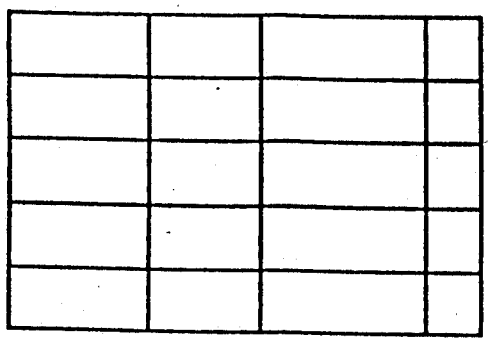
FIGS. 1A to 1C show examples of a table format.
Figure 1B:
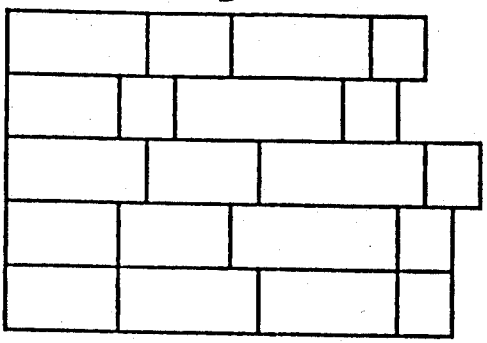
Figure 1C:
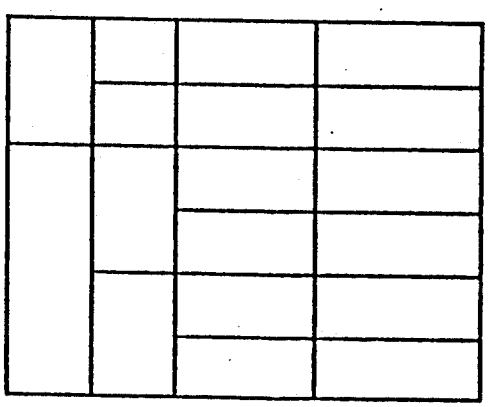
Figure 2A:
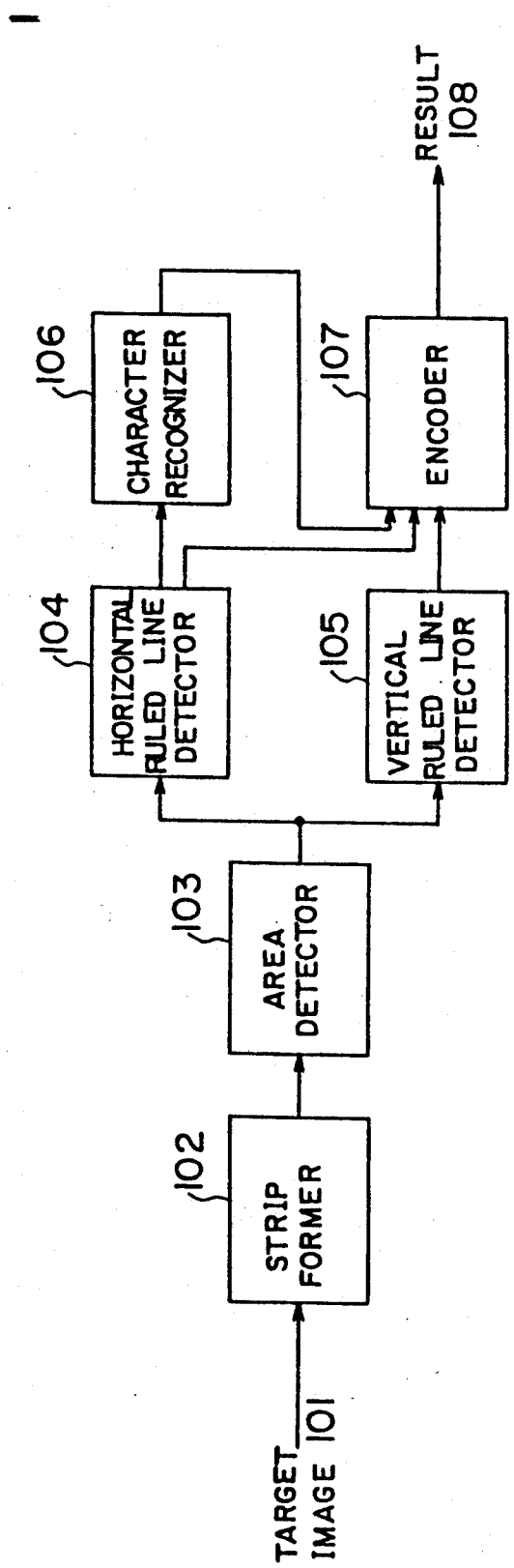
FIG. 2A is a block diagram of a system, for explaining the first principle of this invention.

FIG. 2A is a block diagram for explaining the first principle of this invention. A strip former 102 splits a target image 101 into a plurality of process segments in the form of vertical strips, according to data inputted and stored through an image scanner, etc.

An area detector 103 detects a one-row area after detecting the upper and lower limits of a ruled line or a character area of a process segment.

A horizontal ruled line detector 104 determines whether the one-row area of the process segment detected by the area detector 103 contains a horizontal ruled line or character strings.

A vertical ruled line detector 105 detects a vertical ruled line in a process segment and determines whether each area contains a vertical ruled line by detecting an area containing consecutive black picture elements in the vertical direction, performing a calculation to create a vertical histogram of each area, performing a calculation to create a new histogram by appropriately extending each area in the vertical direction, and determining the difference between these vertical histograms. The vertical ruled line detector 105 is configured to eliminate a break in a ruled line by scanning each area in the vertical direction from the upper limit to the lower limit. In this case, the vertical ruled line detector 105 appropriately modifies the detection range depending on whether or not an area contains a vertical ruled line. The vertical ruled line detector 105 also recognizes an area containing vertical frame lines if the peak of a vertical histogram of the area is detected around the corresponding point of the vertical ruled line of the previous row even though the area is first recognized as not containing a vertical ruled line.

A character recognizer 106 recognizes a character string of a one-row area determined as a character string area.

An encoder 107 encodes each character recognized by the character recognizer 106 into a character code, encodes a vertical and a horizontal ruled line detected by the vertical ruled line detector 105 and the horizontal ruled line detector 104 into a ruled line code, and outputs the result 108 with ruled line codes and character codes mixed.

The strip former 102 splits the target image 101 into a plurality of process segments in the vertical direction.

The area detector 103 detects the upper or lower limit of a ruled line area or a character area by scanning consecutive black picture elements in each strip, and detects one-row areas.

In one-row areas detected by the area detector 103, the horizontal ruled line detector 104 detects horizontal frame lines and the vertical ruled line detector 105 detects vertical ruled lines. If no horizontal frame lines exist in a row, there is the possibility that characters exist, and the character recognizer 106 recognizes character strings of the one-row area. The encoder 107 outputs character codes according to the outputs of the detection by the horizontal ruled line detector 104, the vertical ruled line detector 105, and the character recognizer 106.

The horizontal ruled line detector simultaneously extracts ruled line areas and character areas from an image comprising frame lines and characters, thereby speeding up the recognizing operation.

With the this invention, a recognition device can be created in a simplified configuration by representing recognized characters and frame lines in character code, that is, encoding all recognition results into character codes only.

Figure 2B:
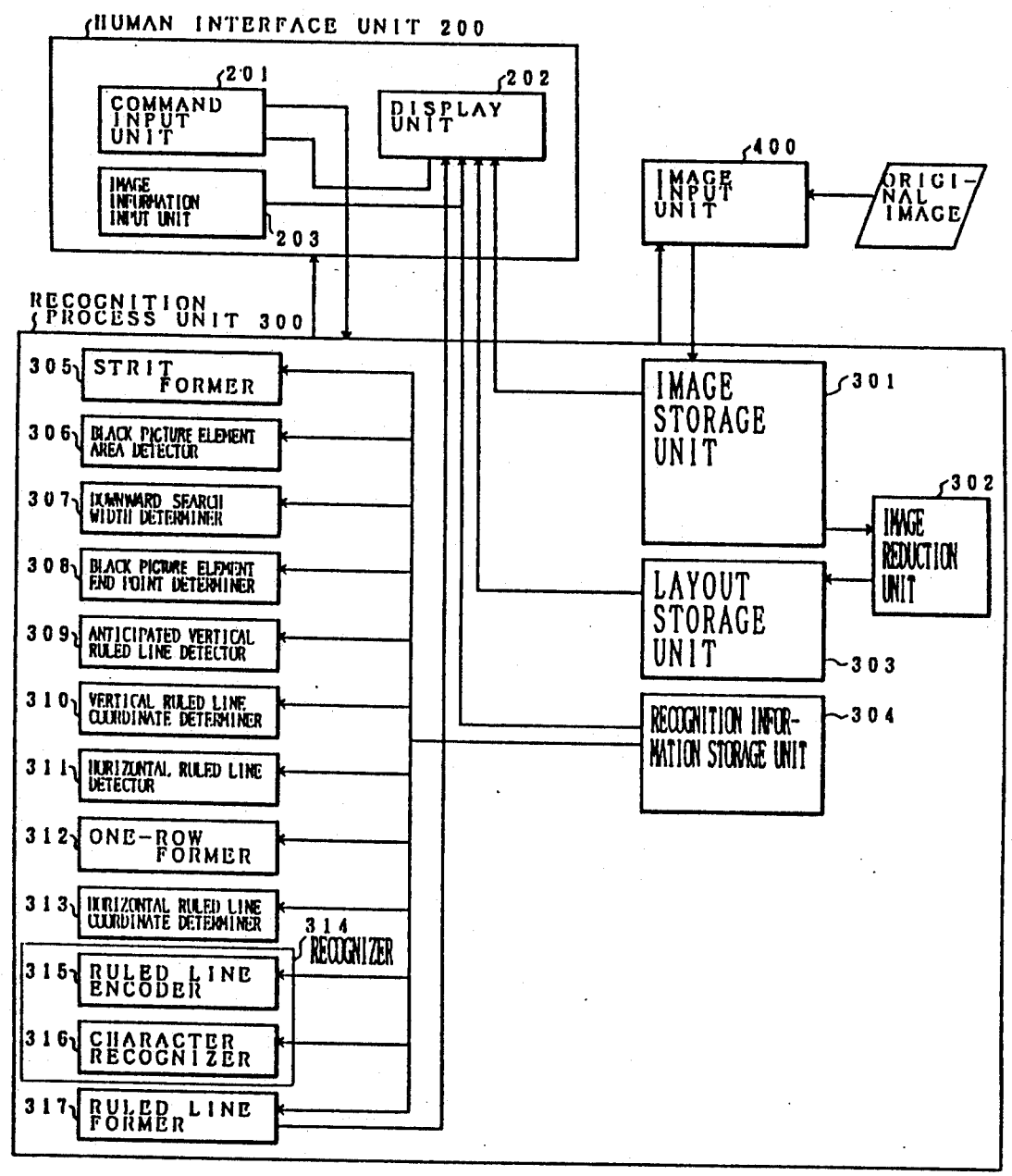
FIG. 2B shows a configuration block diagram of an embodiment of the system applied with the first principle of this invention.
Figure 3:
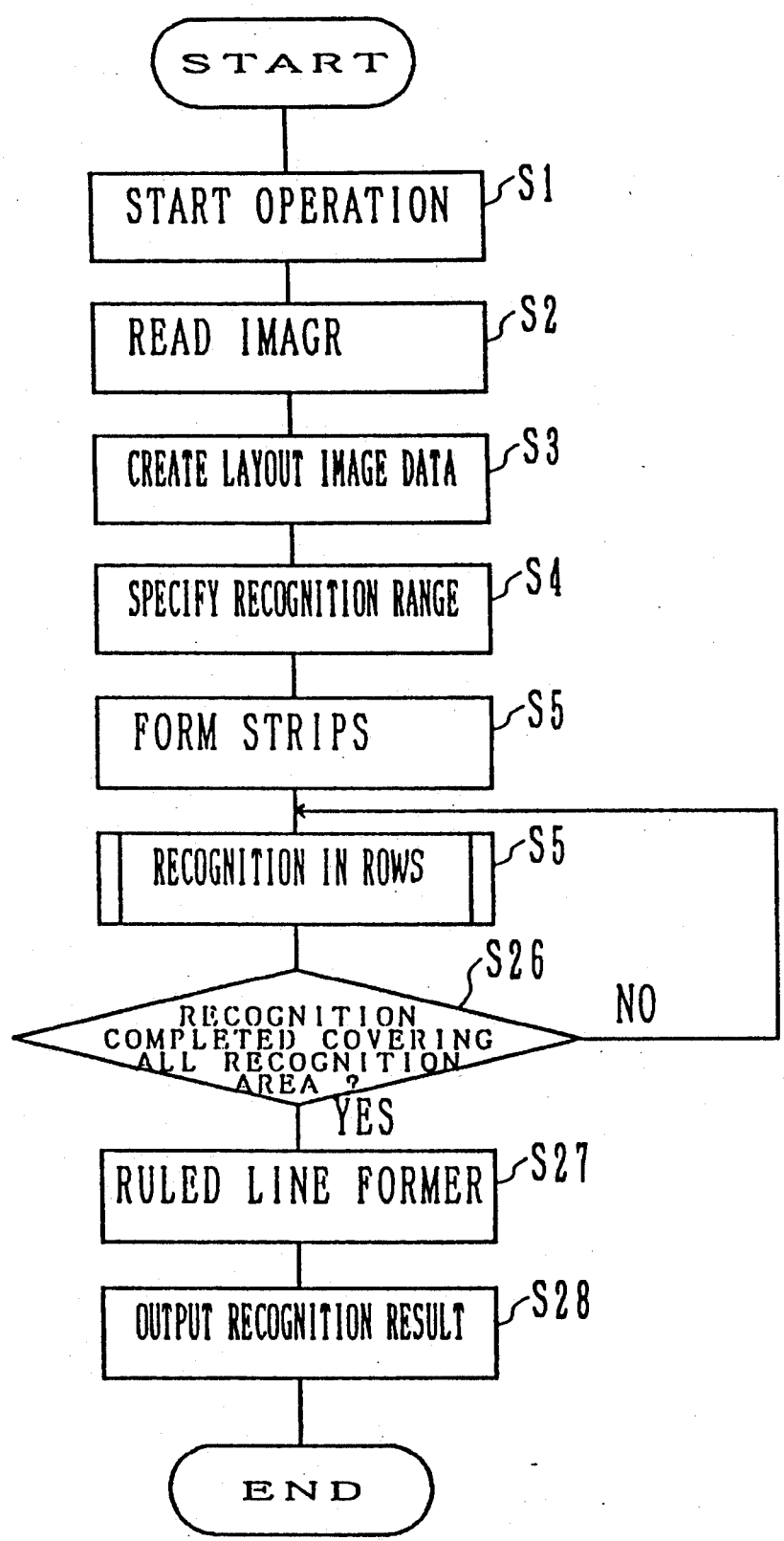
FIG. 3 is a flowchart of the whole operating process of this invention.
Figure 4:
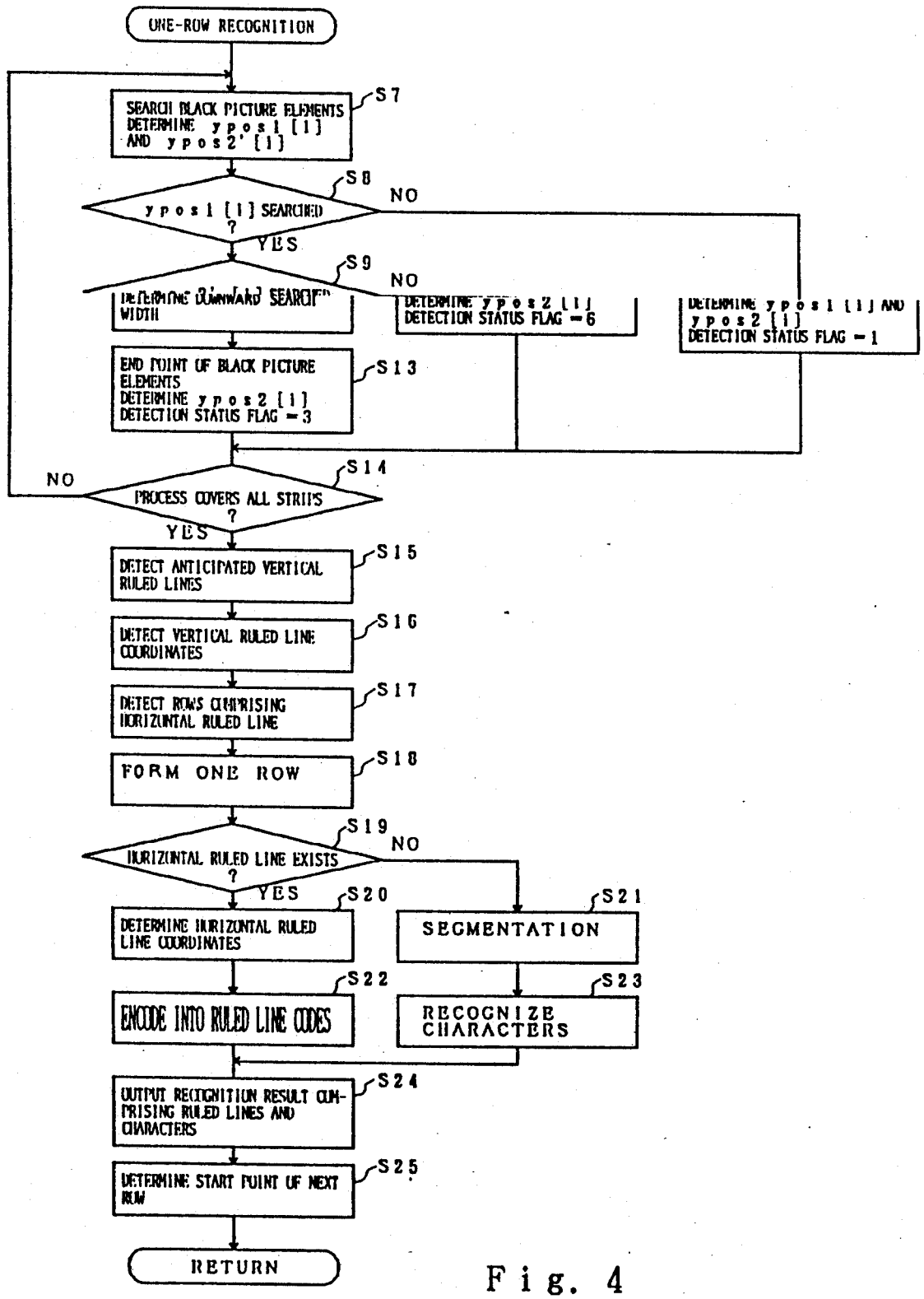
FIG. 4 is a flowchart illustrating, in detail, the row recognition process shown in FIG. 3.

FIG. 2B shows the block diagram of an embodiment of the invention, FIG. 3 is an operational flowchart of the whole process of the this invention, FIG. 4 is an operational flowchart indicating the details of the row recognition process of FIG. 3.

A device shown in of FIG. 2B comprises a human interface unit 200, a recognition processor 300 for transmitting data to and from the human interface unit 200, and an image input unit 400 for transmitting digital image data to the recognition processor.

The human interface unit 200 and the image input unit 400 are first described below. The human interface unit 200 comprises a command input unit 201 for use by an operator, a display unit 202 for displaying character and image information to an operator, and an image information input unit 203 for use by an operator to specify the range of an image in response to the image information indicated by the display unit 202. The human interface unit 200 can be a personal computer, which is the most popular information input/output unit. With a personal computer, the command input unit 201 can be a keyboard, the display unit 202 a CRT, and the image information input unit 203 a pointing device such as a mouse unit, etc.

First, an operator inputs a command to start an operation of the present embodiment through the command input unit 201 (as shown in FIG. 3 S1), thereby sending a command to an image input unit 400 to start receiving images. Then the image input unit 400 starts reading an operator-specified document comprising frame lines and characters (as shown in FIG. 3, S2). The image input unit 400 comprises a scanner, etc., for example. The digital image data read by the image input unit 400 are transmitted to the recognition processor 300.

The recognition processor 300 performs a recognition process as described below:

The digital image data transmitted from the image input unit 400 are stored in an image storage unit 301. In a coordinate system of the image stored in the image storage unit 301, the original point is positioned at the upper left corner of the original image, the positive x axis extends to the right of the original point, and the positive y axis extends downwards. Next, using image data stored in the image storage unit 301, an image reduction unit 302 creates layout image data reduced into one-eight ($\frac{1}{8}$) of the original image data and stores it in a layout storage unit 303 (as shown in FIG. 3, S3).

The layout image data stored in the layout storage unit 303 are transmitted to the display unit 202 and displayed there. An operator specifies the range of a recognizing operation using the image information input unit 203 while looking at the layout image displayed by the display unit 202 (as shown in FIG. 3, S4). For example, a broken line shown in FIG. 5 is used to specify the range.

Figure 5:
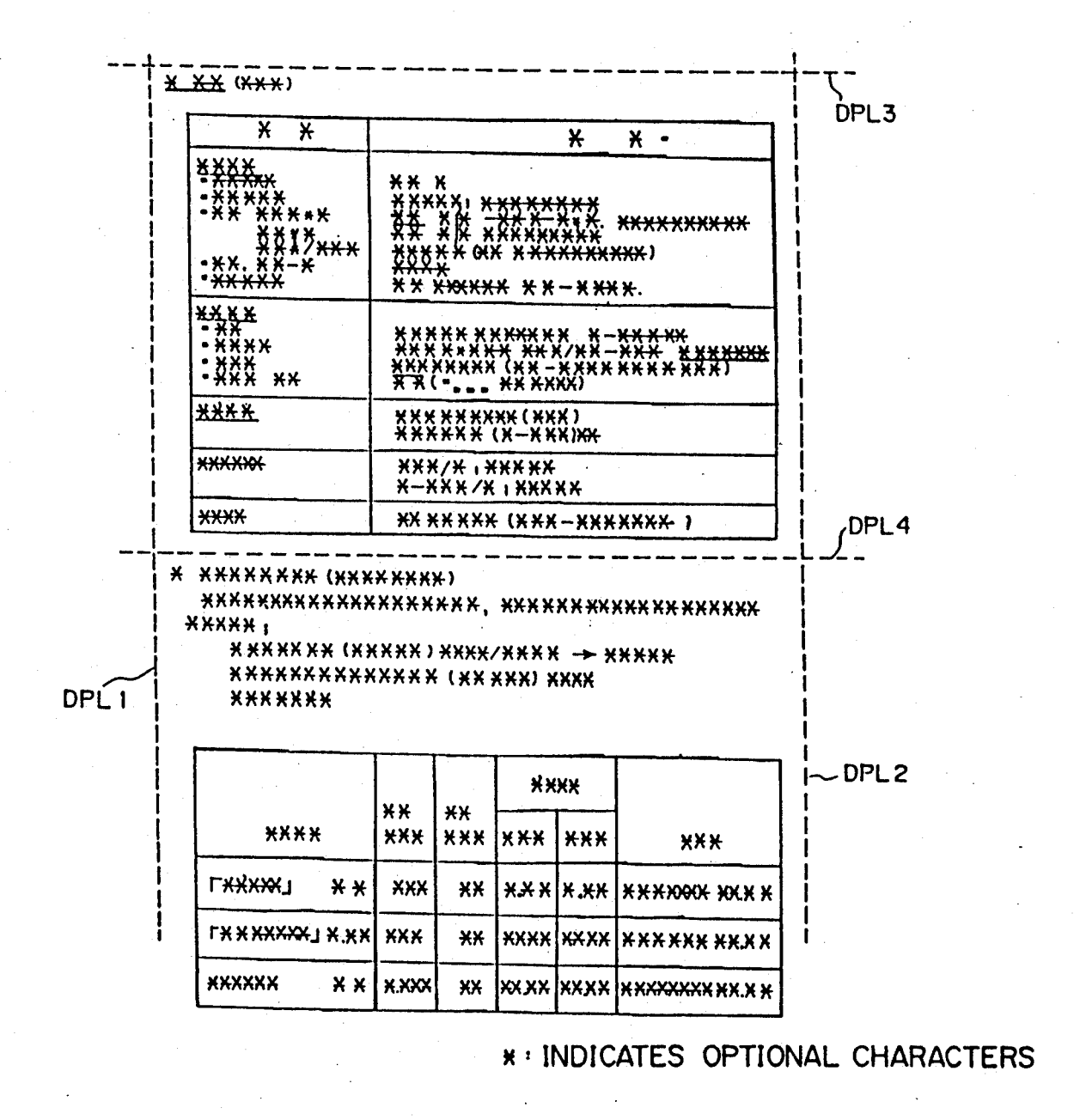

In FIG. 5, a broken line DPL1 identifies the left margin of the process range, DPL2 the right margin, DPL3 the top margin, and DPL 4 the bottom margin. The specified range is transformed to coordinate information and stored in a recognition information storage unit 304 as recognition area coordinates.

Next, a strip former 305 identifies a strip area of specified width (of 48 dots in the present embodiment) in the vertical direction starting from the coordinate at the upper left corner of the recognition area coordinates stored in the recognition information storage unit 304 (refer to FIG. 6), and assigns a strip number i (i=0, 1, 2, 3, 4, . . . ) to each strip starting from the leftmost strip (refer to FIG. 3 S5).

Now the recognizing operation is performed in rows (as shown in FIG. 3, S6). This process is shown in an operational flowchart in FIG. 4.

First, a black-picture-element-area detector 306 searches each strip area for black picture elements (characters and frame lines) using a black picture element sensor, not shown in the FIG. (refer to FIG. 4, S7).

Figure 6:
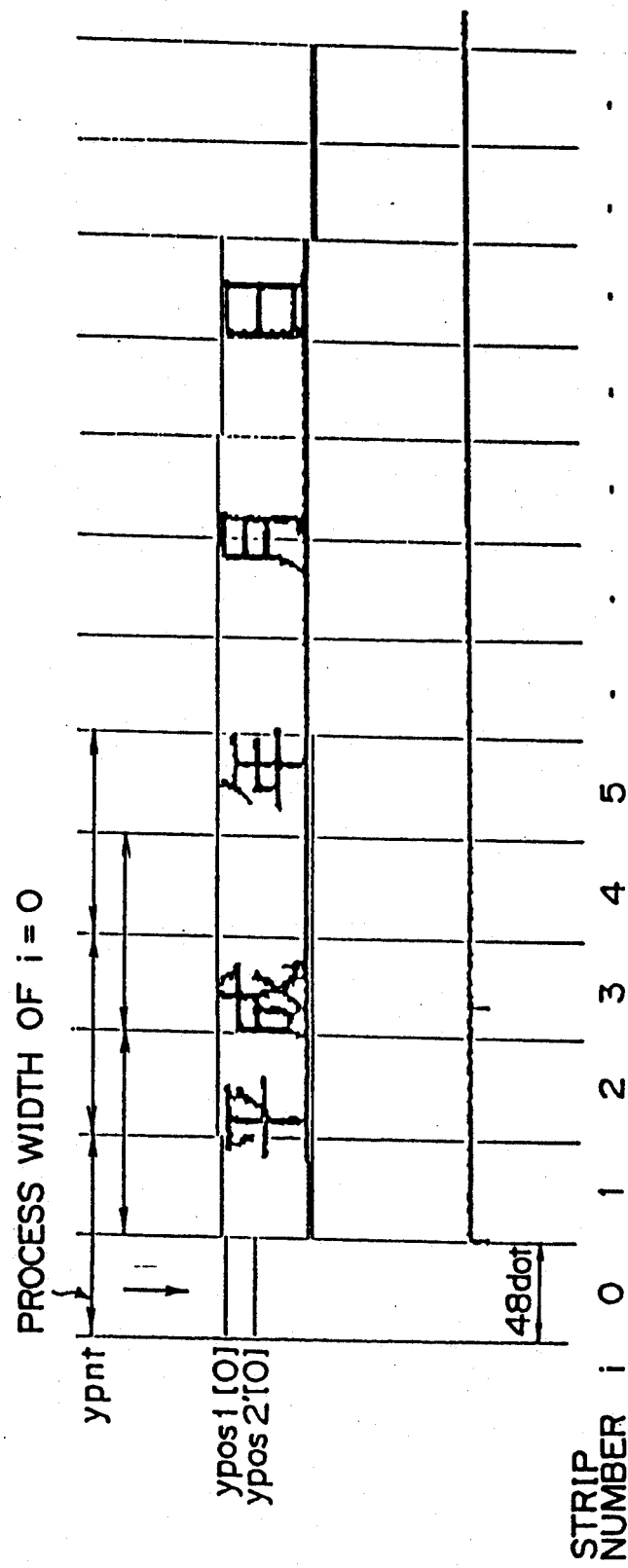
FIG. 6 is a view for explaining strips, y p o s 1, and y p o s 2.

Black picture elements are identified in the software concept, and can be called a black picture element sensing process. The black picture element sensor (y p n t [i], where i is a strip number) has a sensing width of 2 strips (strip i and strip i+1) as shown in FIG. 6. It searches for black picture elements starting from the top of each strip, and determines whether any black picture elements are contained in picture elements searched by the black picture element sensor. The y coordinate (y p n t [i]) is designated as the start point of black picture elements (y p o s 1 [i]) at the point where a detection result turns from white to black, and is stored in the recognition information storage unit 304. The black picture element sensor continues the detecting operation after obtaining y p o s 1 [1] until it reaches the point where a detection result turns from black to white. When a detection result turns from black to white, the y coordinate which contains the last black picture element is stored in the recognition information storage unit 304 as the pseudo-end point of black picture elements (y p o s 2' [i]).

Figure 7:
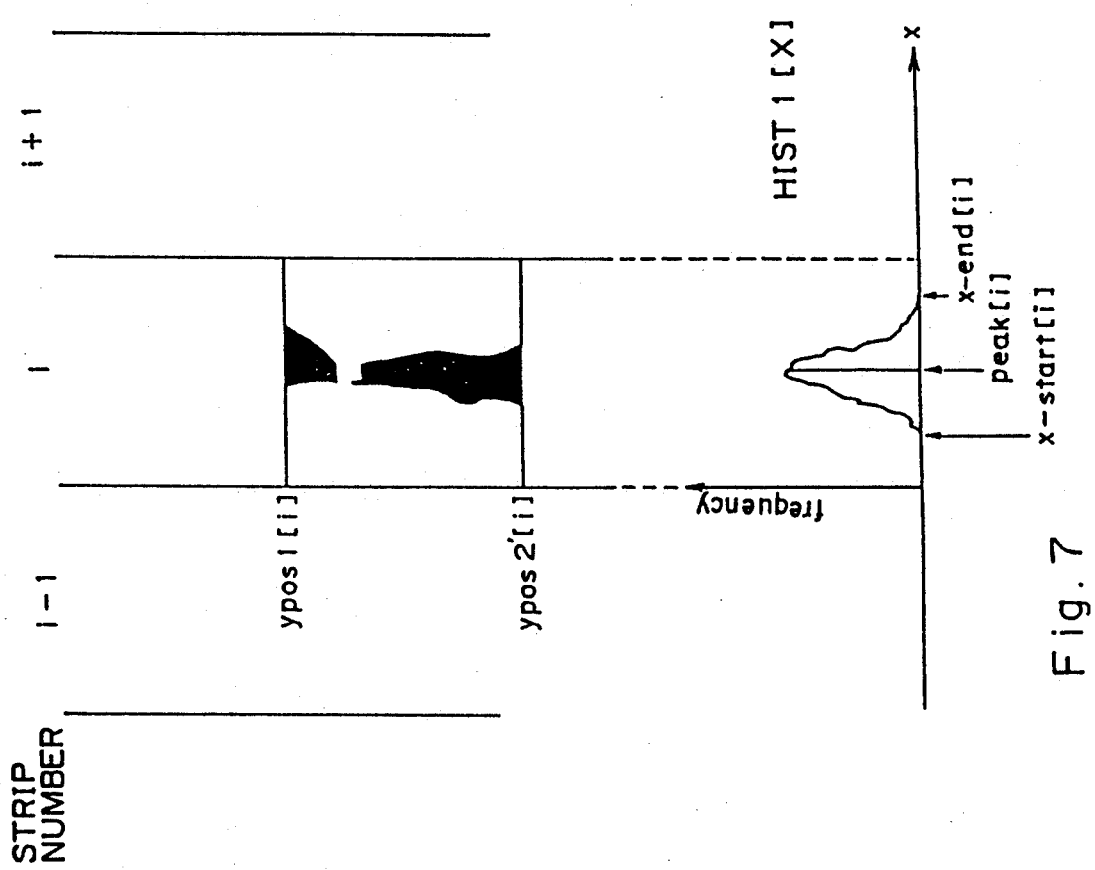
FIG. 7 is a view for explaining a vertical histogram.
Figure 8:
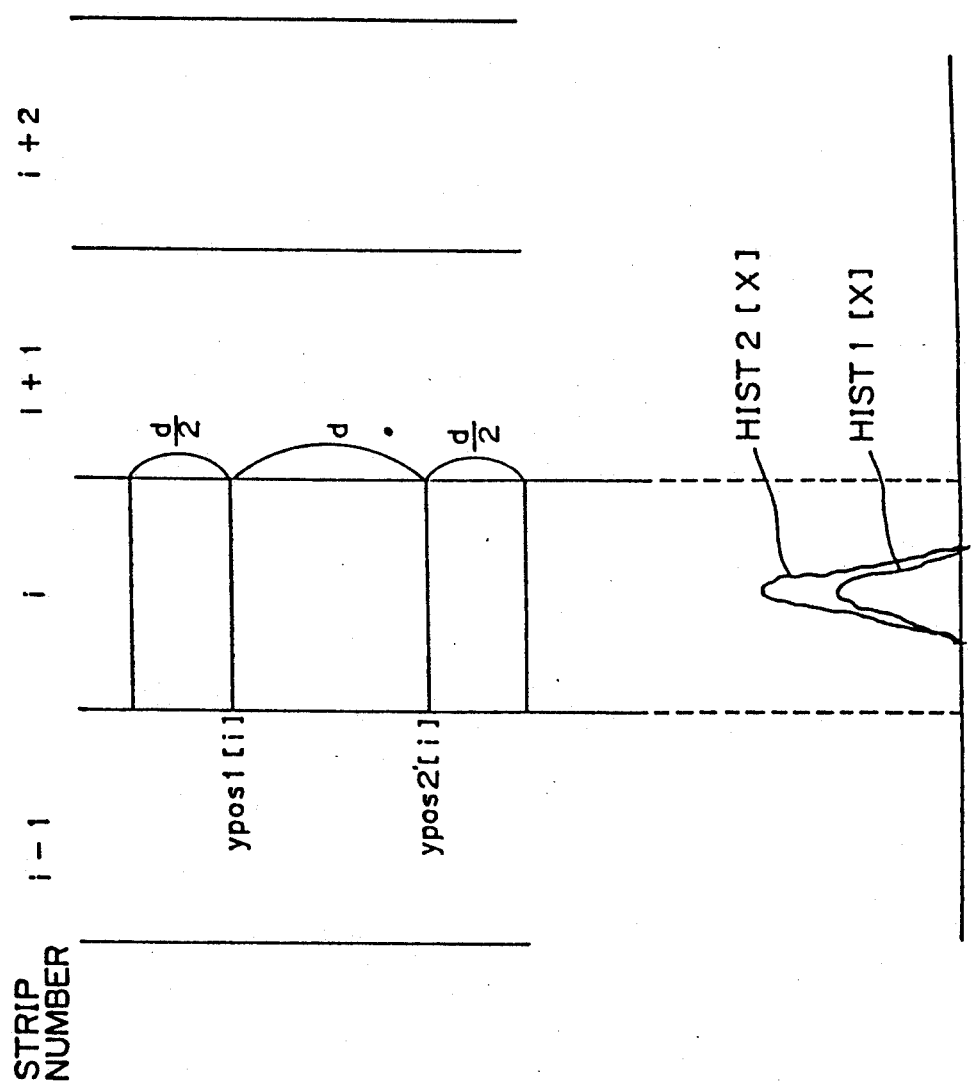
FIG. 8 is a view for explaining a downward search width determination.

The pseudo-end point of black picture elements may indicate an accidental break of a character or a ruled line, and detected as the end point even though the break is only 1 picture element wide. Therefore, a downward search width determiner 307 decides the allowable width of an accidental break of black picture elements (refer to FIG. 4, S10) so that the black picture element area detector 306 may continue detecting black picture elements even when there is an accidental break of a character or a ruled line. The downward search width determiner 307 obtains a vertical histogram (h i s t 1 [x]) between the start point of black picture elements (y p o s 1 [i]) and the pseudo-end point of black picture elements (y p o s 2' [i]), and then obtains the maximum value of the vertical histogram (h i s t 1 [x]) and the x coordinate (p e a k [i]) yielding the maximum value (refer to FIG. 7). Next, values of the vertical histogram around the peak point [i] are checked to detect the value of 0 of the histogram toward both sides of p e a k [i], thereby obtaining the coordinates where the value of the vertical histogram turns higher than 0 (starting coordinate: x__start [i]) and turns 0 from the value higher than 0 (ending coordinate: x__end [i]) (refer to FIG. 7). The following process is performed to determine whether an area of the histogram comprises a vertical ruled line. The vertical histogram ranges between the pseudo-end point of black picture elements y p o s 2' [i] and the start point of black picture elements y p o s 1 [i]. The range d (=y p o s 2' [i]−y p o s 1 [i]+1) is two times extended to be between y p o s 1 [i]−0.5d and y p o s 2' [i]+0.5d (refer to FIG. 8). Within this range, the vertical histogram (h i s t 2 [x]) between x__s t a r t [i] and x__end [i] is obtained (refer to FIG. 8). If the maximum value exceeds the value of h i s t 1 [x] beyond the specified threshold, it is recognized that the present strip comprises a vertical ruled line. This strip is provided with a downward search width of 4 picture elements and other strips of 1 picture element.

Next, a black picture element end point determiner 308 detects the end point of black picture elements according to the downward search width (refer to FIG. 4, S13). The black picture element end point determiner 308 searches an area of the downward search width from the pseudo-end point of black picture elements (y p o s 2' [i]) using the black picture element sensor (y p n t [i]). If black picture elements are detected, it is determined that the break of black elements is caused by an accidental break, and the process of detecting the pseudo-end point of black picture elements by the black picture element area detector 306 and the process by the downward search width determiner 307 are repeated. When a search stops recognizing black picture elements, it is determined that the end point of black picture elements is finally detected; the y coordinate where the last black picture element is detected is designated as the end point of black picture elements y p o s 2 [i]; the strip is provided with a detection status flag=3; and the information is stored in the recognition information storage unit 304.

If the start point (y p o s 1 [i]) of black picture elements is decided, black picture elements exist consecutively in the vertical direction, and white picture elements are not detected, then the y coordinate of the point is decided as the end point of black picture elements (y p o s 2 [i]) after the predetermined range is searched. The strip is provided with a detection status flag=6, regarding the strip as an anticipated strip comprising a vertical ruled line, and the information is stored in the recognition information storage unit 304 (refer to FIG. 4 S8, S9, S11).

If no black picture elements are detected by the black picture element sensor for searching the predetermined range, then the detecting operation is stopped, the y coordinates of the start point and end point are designated respectively as the start point of black picture elements (y p o s 1 [i]) and the end point of black picture elements (y p o s 2 [i]), the strip is provided with a detection status flag=1, and the information is stored in the recognition information storage unit 304 (refer to FIG. 4, S8 and S12).

The above operation by the black picture element area detector 306, the downward search width determiner 307, and black picture element end point determiner 308 is repeated (refer to FIG. 4 S14 and S7) to obtain y p o s 1 [i] and y p o s 2 [i] of all strips. Thus, a one-row black picture element area is determined by the above operation. Next, anticipated vertical frame lines of each strip are extracted.

Figure 9:
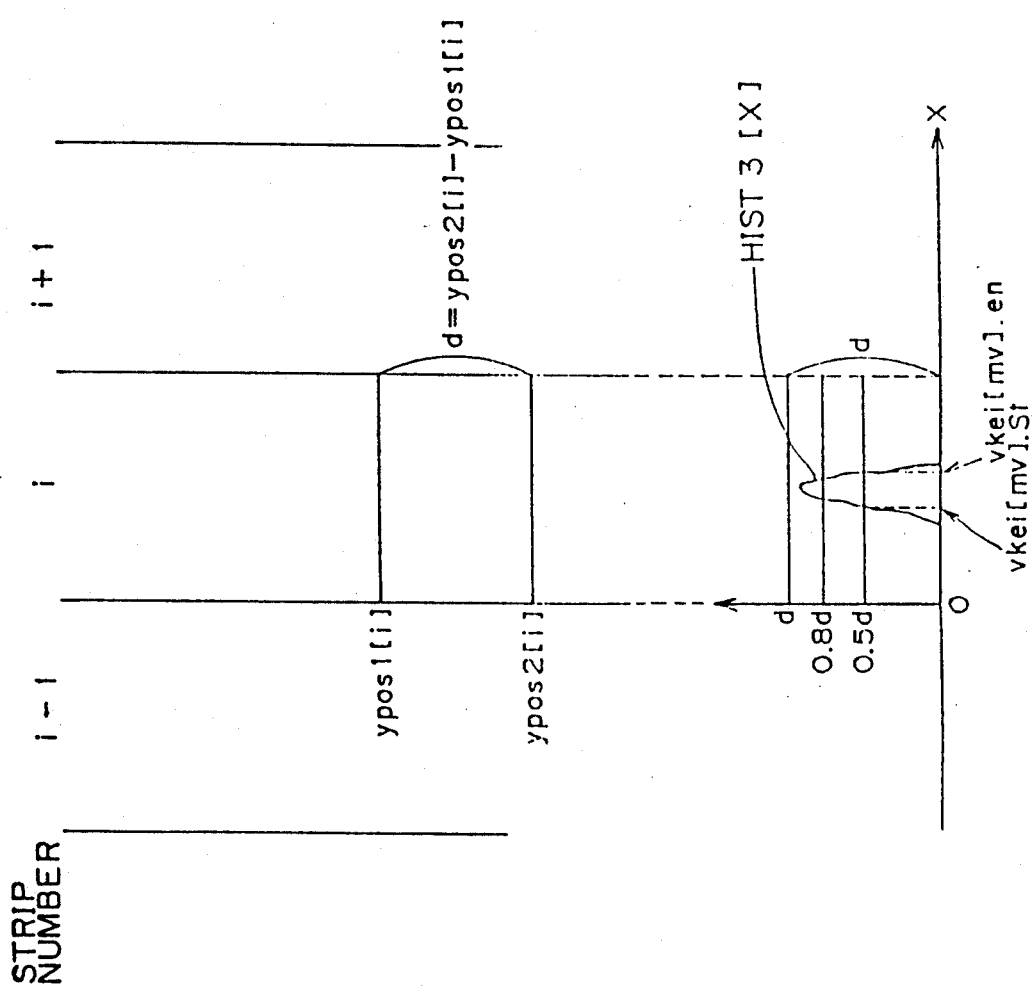
FIG. 9 is a view for explaining an anticipated vertical ruled line detection.

An anticipated vertical ruled line detector 309 obtains a vertical histogram (h i s t 3 [x]) between the start point of black picture elements (y p o s 1 [i]) and the end point of black picture elements (y p o s 2 [i]), and searches for the point where the value of the histogram exceeds 80% of the value y p o s 2 [i]−y p o s 1 [i]. If the histogram exceeds 80%, then a vertical ruled line is anticipated, the start point (v k e i [mv]. s t) and end point (v k e i [mv]. en) (where mv is the number of anticipated vertical frame lines) are determined where the value of the histogram reaches 50% decreasing from 80% toward both sides of the 80% point (refer to FIG. 9), and the information is stored in the recognition information storage unit 304 (refer to FIG. 4, S15).

Figure 10:
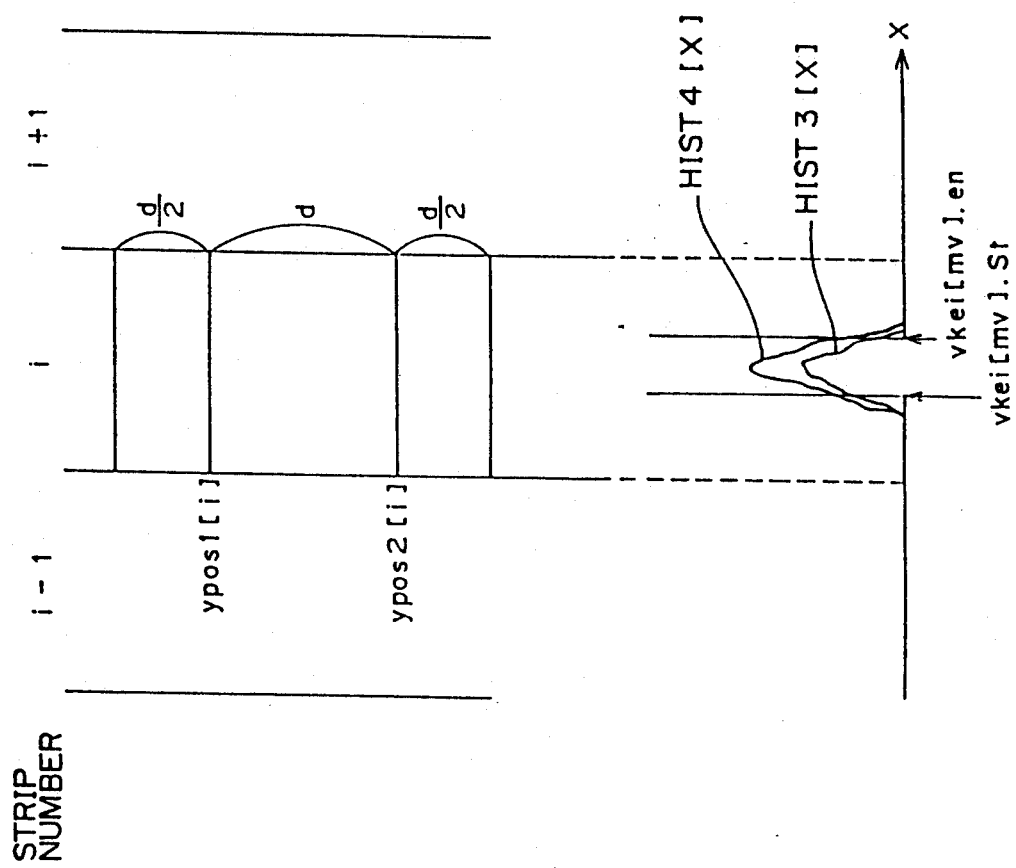
FIG. 10 is a view for explaining a vertical ruled line coordinate determination.

A vertical ruled line coordinate determiner 310 determines coordinates of vertical frame lines according to the start and end points of anticipated vertical frame lines extracted by the anticipated vertical ruled line detector 309 (refer to FIG. 4, S16). When the detection status flag 6 is set in a strip comprising anticipated vertical frame lines, a vertical histogram must be obtained (h i s t 4) by extending a half of the width between the start and the end point of black picture elements (y p o s 2 [i]−y p o s 1 [i]). The extending operation starts from y p o s 1 [i] upwards and y p o s 2 [i] downwards respectively as shown in FIG. 10. If the vertical histogram h i s t 4 [x] exceeds the vertical histogram h i s t 3 [x] between v k e i [m v]. s t and v k e i [m v]. e n by more than the specified percentage, it is recognized as a vertical ruled line. If the anticipated vertical ruled line is not recognized as a vertical ruled line, it is deleted from the anticipated vertical ruled line v k e i. If a detection status flag 3 is set, the anticipated vertical ruled line is recognized as a vertical ruled line when the anticipated vertical ruled line is positioned around the position of the vertical ruled line of the preceding row. Otherwise, it is deleted.

Figure 11:
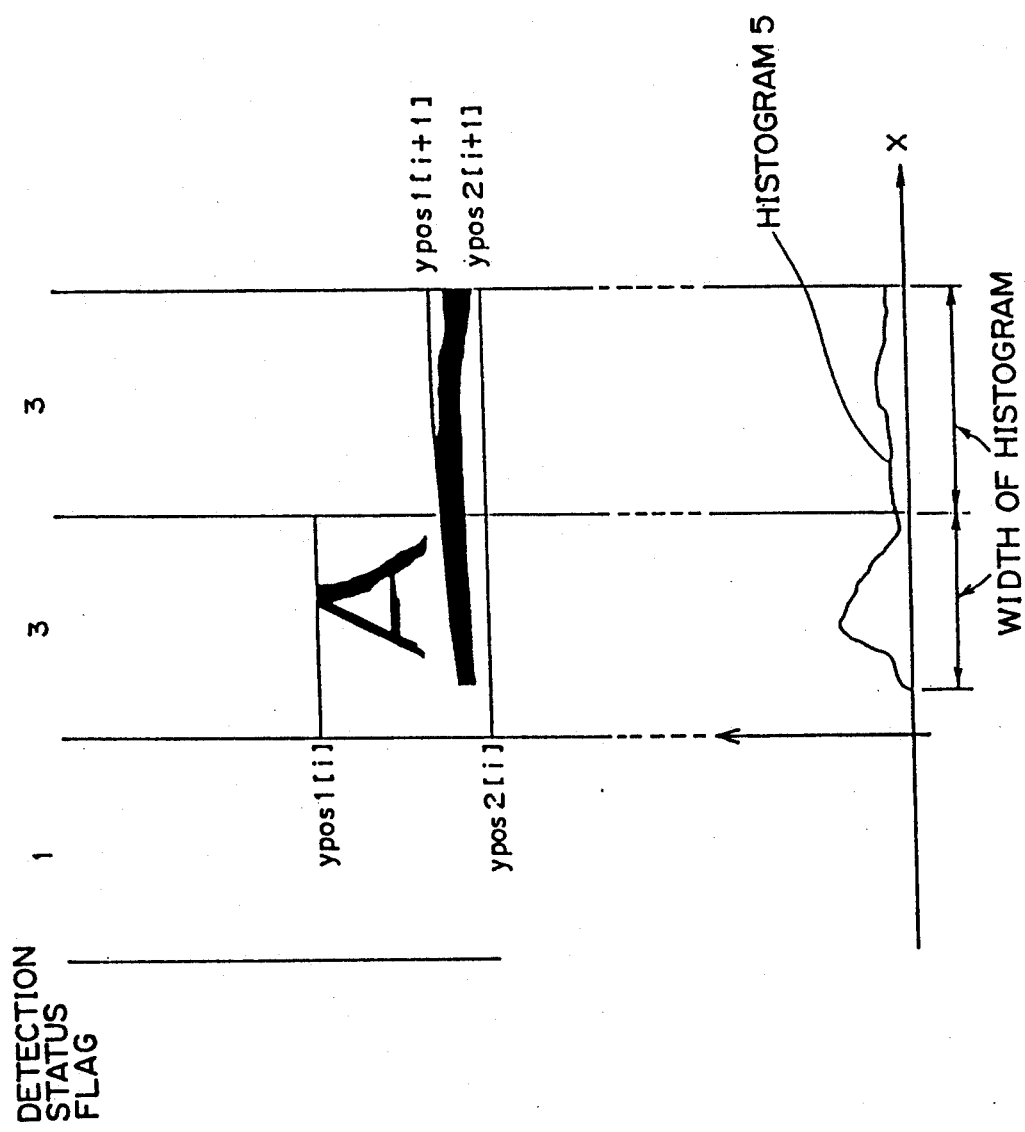
FIG. 11 is a view for explaining a horizontal ruled line detection.

Next, a horizontal ruled line detector 311 determines a row comprising a horizontal ruled line (refer to FIG. 4, S17). As shown in FIG. 11, if a detection status flag 3 is set in a strip, a vertical histogram (h i s t 5 [x]) is obtained between y p o s 1 [i] and y p o s 2 [i]. If the width of the histogram h i s t 5 [x] exceeds a pre-determined threshold, the strip comprises a ruled line or characters. In this case, if the value y p o s 2 [i]−y p o s 1 [i] exceeds a pre-determined threshold, the strap comprises character strings, and the information is stored in the recognition information storage unit 304. If the value y p o s 2 [i]−y p o s 1 [i] is smaller than the threshold, the strip comprises horizontal frame lines, and the information is stored in the recognition information storage unit 304.

Figure 12:
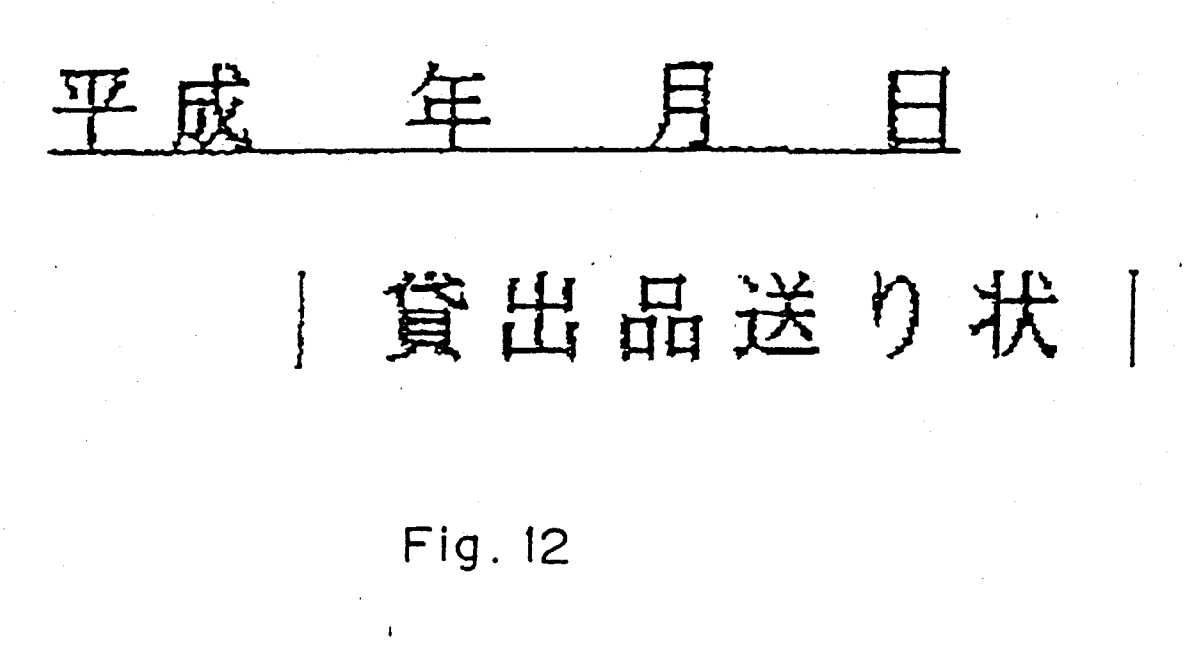

If the horizontal ruled line detector 311 determines that a strip comprises a horizontal ruled line, a one-row former 312 forms the strip in rows as a pre-process for determining coordinates of horizontal frame lines (refer to FIG. 4, S18). The one-row forming process is preformed only on strips determined by the horizontal ruled line detector 311 as comprising a horizontal ruled line. If strips comprising character strings are mixed, all strips having the detection status flag 3 are processed by the one-row forming process. The result is shown in FIG. 12.

Then, a determination is made as to whether a horizontal ruled line exists in a strip (refer to FIG. 4, S19). If it does (Yes), a horizontal ruled line coordinate determiner 313 determines its coordinates according to the result obtained by the one-row former 312 (refer to FIG. 4, S20). After the forming process, a vertical histogram is obtained between y p o s 1 [i] and y p o s 2 [i]. If the difference between the coordinates where the value of the histogram is smaller than a pre-determined threshold exceeds the pre-determined threshold, the horizontal ruled line information is stored as the start point (h k e i [m h]. s t) and the end point (h k e [m h]. e n) in the recognition information storage unit 304.

If the horizontal ruled line detector 311 determines that a strip contains no horizontal frame lines but comprises characters (refer to FIG. 4, S19 "No"), a recognizer 314 recognizes characters in a character area obtained by the horizontal ruled line detector 311. After the one-row former 312 forms a strip, a vertical ruled line portion is removed using a one-row vertical histogram (h i s t 6 [x]), a character forming (or character segmenting or segmentation) operation is performed (refer to FIG. 4, S21) using a vertical histogram h i s t 6 [x], the start coordinate and end coordinate of the character area are compared with the vertical ruled line coordinates (v k e i), and then coordinates are outputted starting from the smallest value.

According to the determined coordinates of horizontal frame lines (refer to FIG. 4, S20), a ruled line encoder 315 encodes the coordinates into JIS ruled line codes in outputting frame lines (refer to FIG. 4, S22). When characters are outputted in a character forming process (refer to FIG. 4, S21), a character recognizer 316 recognizes them and encodes them into character codes (refer to FIG. 4, S23).

After frame lines and characters are encoded, character codes are stored in the recognition information storage unit 304 as shown in FIG. 3 according to corresponding coordinates of frame lines and characters (refer to FIG. 4, S24).

In the above process, a ruled line or characters in one row are recognized and encoded. A process S6 in FIG. 3 which is also indicated in an operational flowchart in FIG. 4 is repeated as shown in FIG. 3 S26, thereby performing one-row recognition. The starting position of the next row just follows y p o s 2 [i] after the forming process (refer to FIG. 4, S25).

The process in FIG. 4 is a one-row recognition process which is sequentially repeated until the end of the rows are reached. The final result is shown in FIG. 12.

Figure 14:
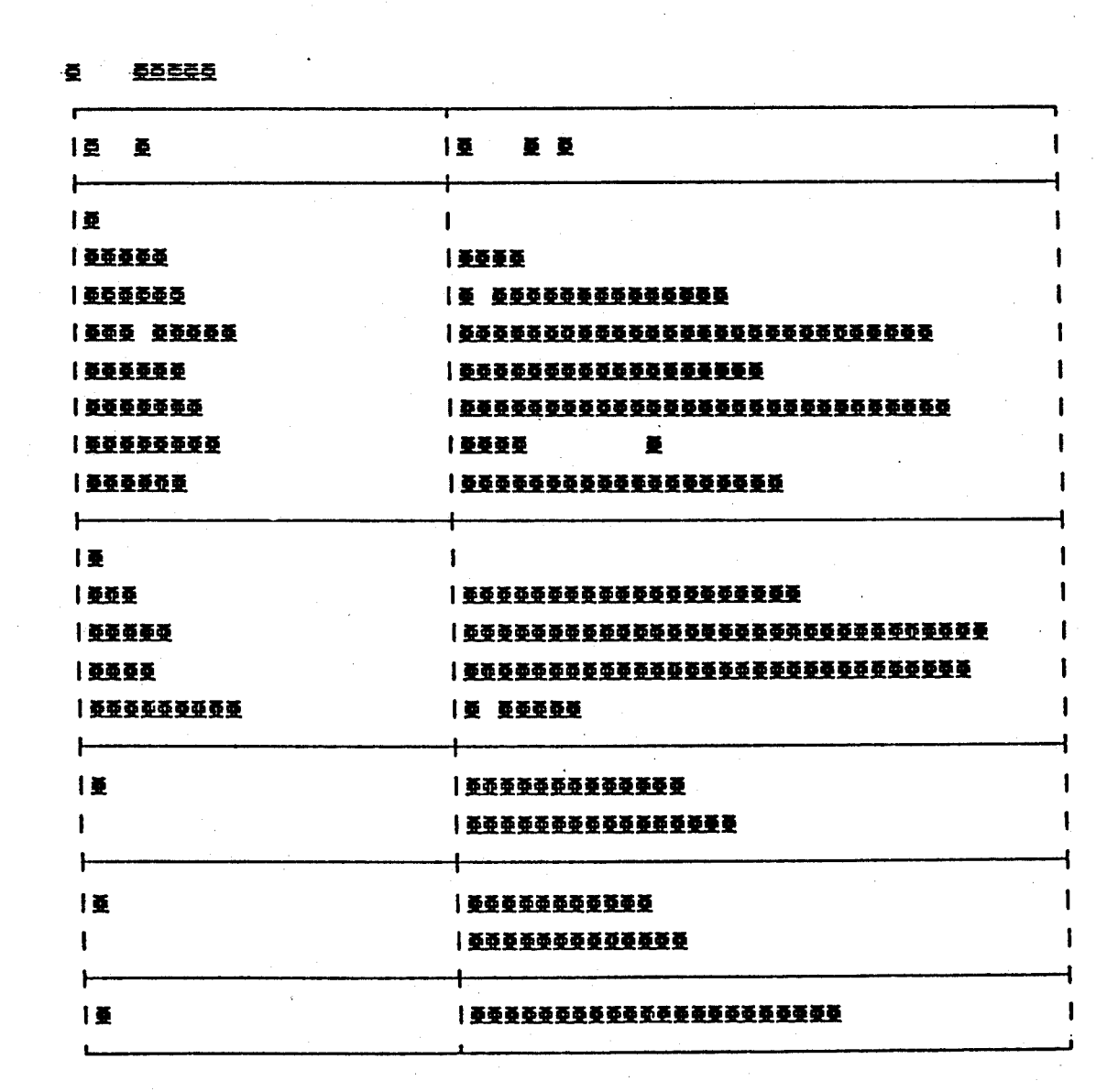

When the recognizing process is completed covering the whole process range specified by the image information input unit 203 (refer to FIG. 3, S26 "Yes"), a ruled line former 317 inserts or removes space codes or horizontal ruled line codes before and after vertical frame lines (refer to FIG. 3 S27) to prevent breaks of frame lines. The result is displayed by the display unit 202 (refer to FIG. 3 S28) as shown conceptually in FIG. 14.

Figure 15:
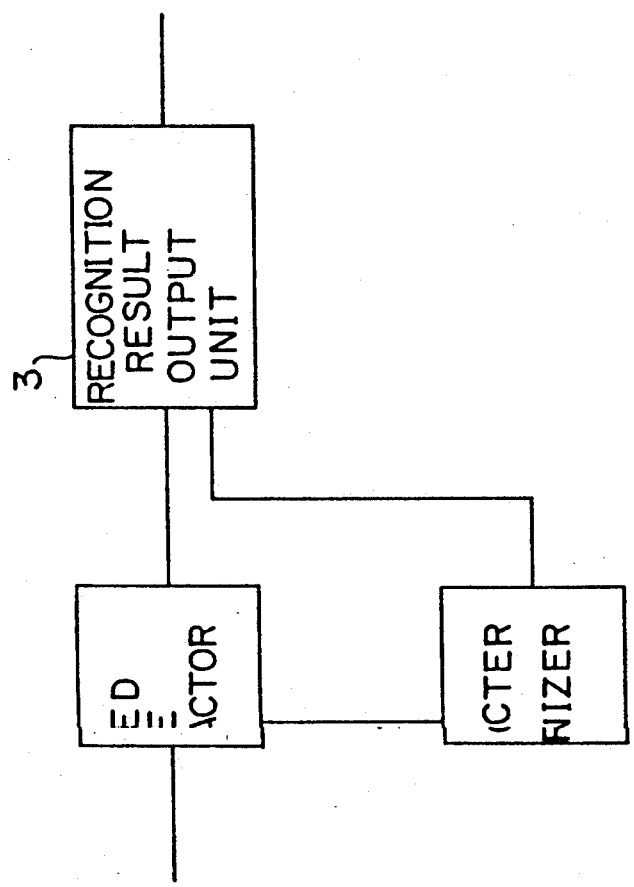
FIG. 15 is a block diagram of a system, for explaining the second principle of this invention.

FIG. 15 is a block diagram of a system, for explaining the second principle of this invention.

A ruled line extractor 1 receives image information to be recognized and extracts coordinates of frame lines. The ruled line extractor 1 also obtains a slant of the extracted frame lines.

A character recognizer 2 recognizes characters in the area outside the ruled line portion extracted by the ruled line extractor 1. The character recognizing operation is performed in rows while determining the area of each row. The character recognizer 2 obtains an area of each row according to the slant of an extracted ruled line, and then recognizes characters of that row.

A recognition result output unit 3 outputs character codes comprising ruled line codes according to the results of the ruled line extractor 1 and the character recognizer 2.

The ruled line extractor 1 recognizes frame lines and extracts the coordinates of the ruled line. The extracted result and image information are provided to the character recognizer 2 which recognizes characters in an area outside the ruled line portion. The result obtained by the character recognizer 2 and the coordinates of frame lines extracted by the ruled line extractor 1 are provided to the recognition result output unit 3 which outputs all results in character code. The result obtained by the ruled line extractor 2 can be inputted in rows, a slant of a ruled line is provided also by the ruled line extractor 2, and the recognition result output unit 3 encodes all characters and frame lines based on the slant of a ruled line and inputted image.

Thus, this invention enables both characters and frame lines to be outputted in character code.

Figure 16:
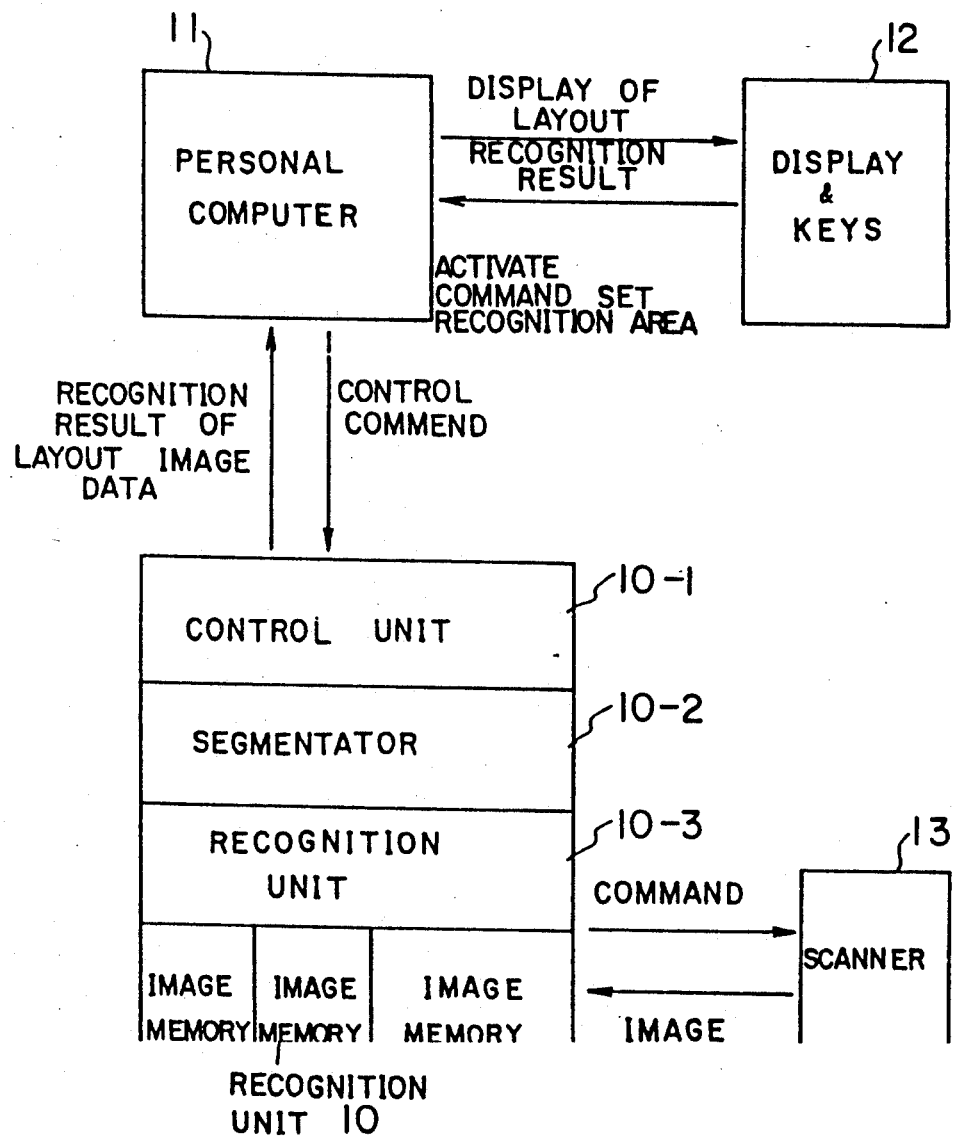
FIG. 16 shows a block diagram of an embodiment applied with the second principle of this invention.

FIG. 16 shows a system of the second version of this invention. A recognizer 10 comprises a control unit 10-1, a character former 10-2, a recognition unit or recognizer 10-3, and image memories 10-4–10-6.

The control unit 10-1 controls the character former 10-2, the recognizer 10-3, and the image memories 10-4–10-6, and outputs layout image data and recognition results to peripherals such as a personal computer 11. From the personal computer 11, control commands are inputted as an operator's instructions. A display & key unit 12 is connected to the personal computer 11 which displays the inputted layout and the recognition result of the layout image data to the display & key unit 12. In response to an operator's request, an activate command and the information from a recognition area setting unit are provided through the display & key unit 12. The personal computer 11 provides the control unit 10-1 with all these data as control commands. If the personal computer 11 issues a control command to form a character, the character former 10-2 is controlled to form a character area. If an issued command instructs to perform a recognizing operation, the recognizer 10-3 is controlled to recognize characters. The data used to recognize characters are stored in the image memories 10-4–10-6.

A scanner 13 is connected to the recognizer 10 and reads image data in response to a read command, etc. issued from the control unit 10-1. It then outputs the data to the recognizer 10. The read image data are stored in the image memories 10-4–10-6. Thus, a recognizing operation is performed.

Figure 17:
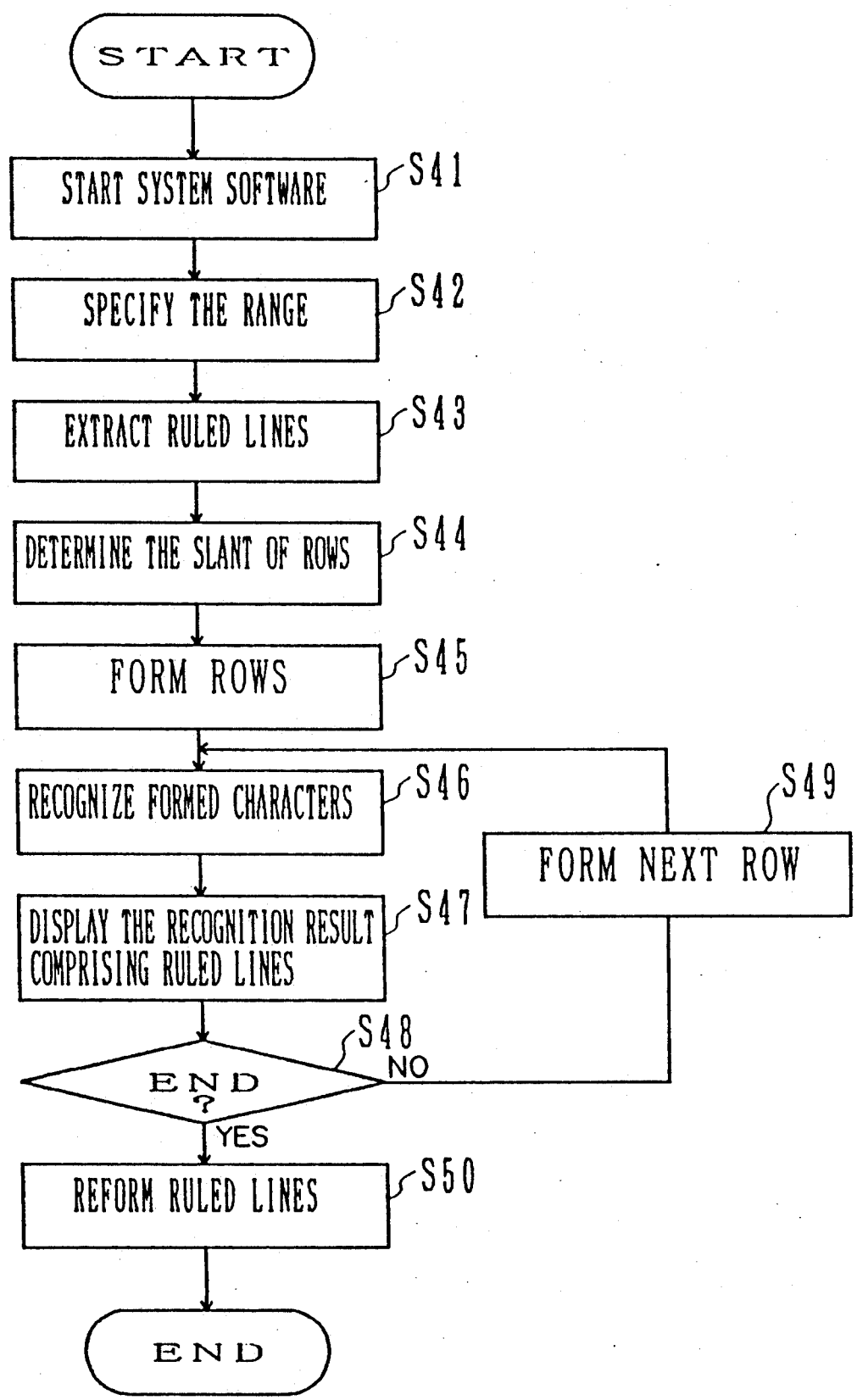
FIG. 17 is a flowchart of the process of an embodiment of this invention.

The operation of an embodiment of the second version of the invention is described in detail below:

FIG. 17 is a flowchart of the process of an embodiment of this invention. The scanner starts working when a recognizing operation is started, and images to be read are received by the image memory 10-4. More specifically, a control command according to an operator's key operation is transmitted to the personal computer 11 and then to the control unit 10, and a command to store the image data in the image memory 10-4 of the recognizer 10 is outputted to the scanner 13. Then the scanner 13 receives the corresponding image data and stores them in the image memory 10-4 (S41). The image data stored in the image memory 10-4 are transformed into a ¼ reduced image by the control unit 10-1 and stored in the image memory 10-5. The reduced image data stored in the image memory 10-5 are read and provided to the personal computer 11, which then displays them on the display & key unit 12. Using this display, an operator specifies the range to be recognized, and the personal computer 11 provides the range for the recognizer 10 (S42).

As shown in the chart explaining the specified range of layout image in FIG. 5, the display & key unit 12 displays a ¼ reduced image, and an operator specifies an area enclosed in 4 broken lines DPL1–DPL4 as an area to be recognized and inputs the information to the personal computer 11. The information is transmitted to the control unit 10-1 for controlling the process associated with the area.

Figure 18:
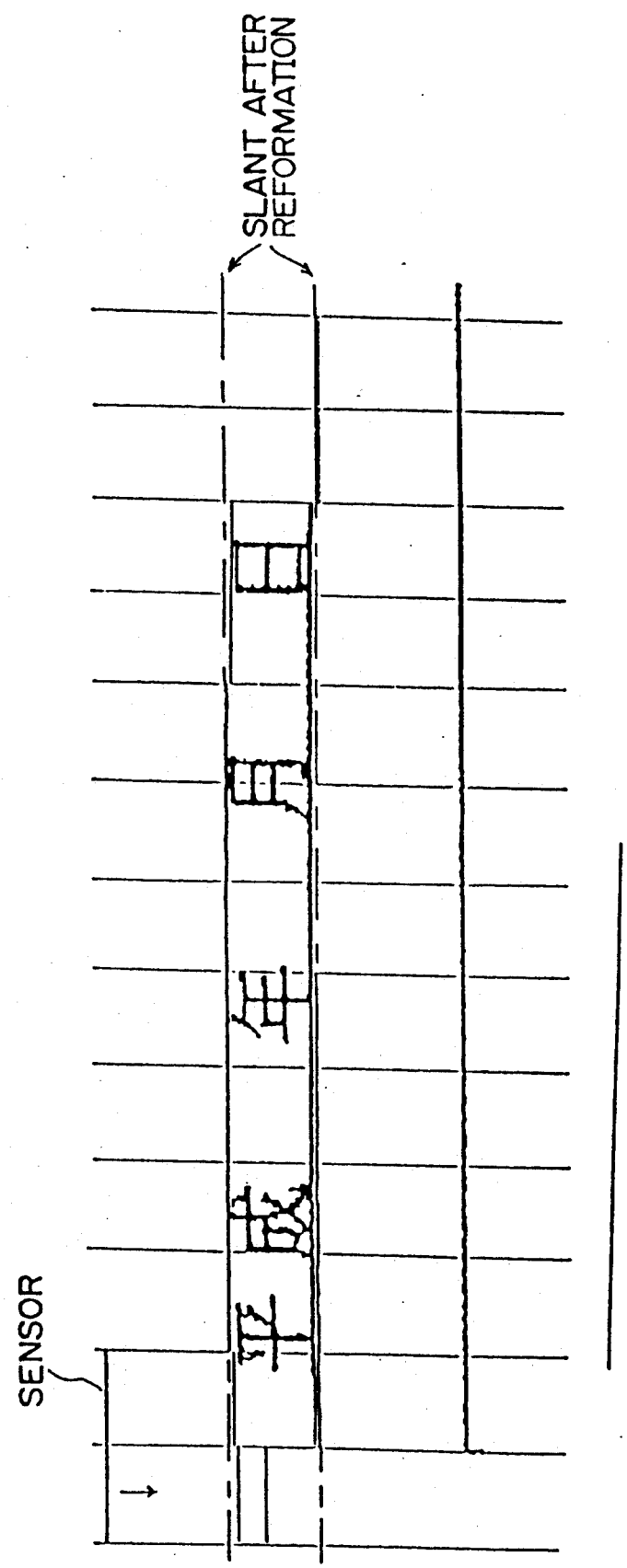
FIG. 18 shows a process for obtaining the slant when no horizontal frame lines exist.
Figure 19:
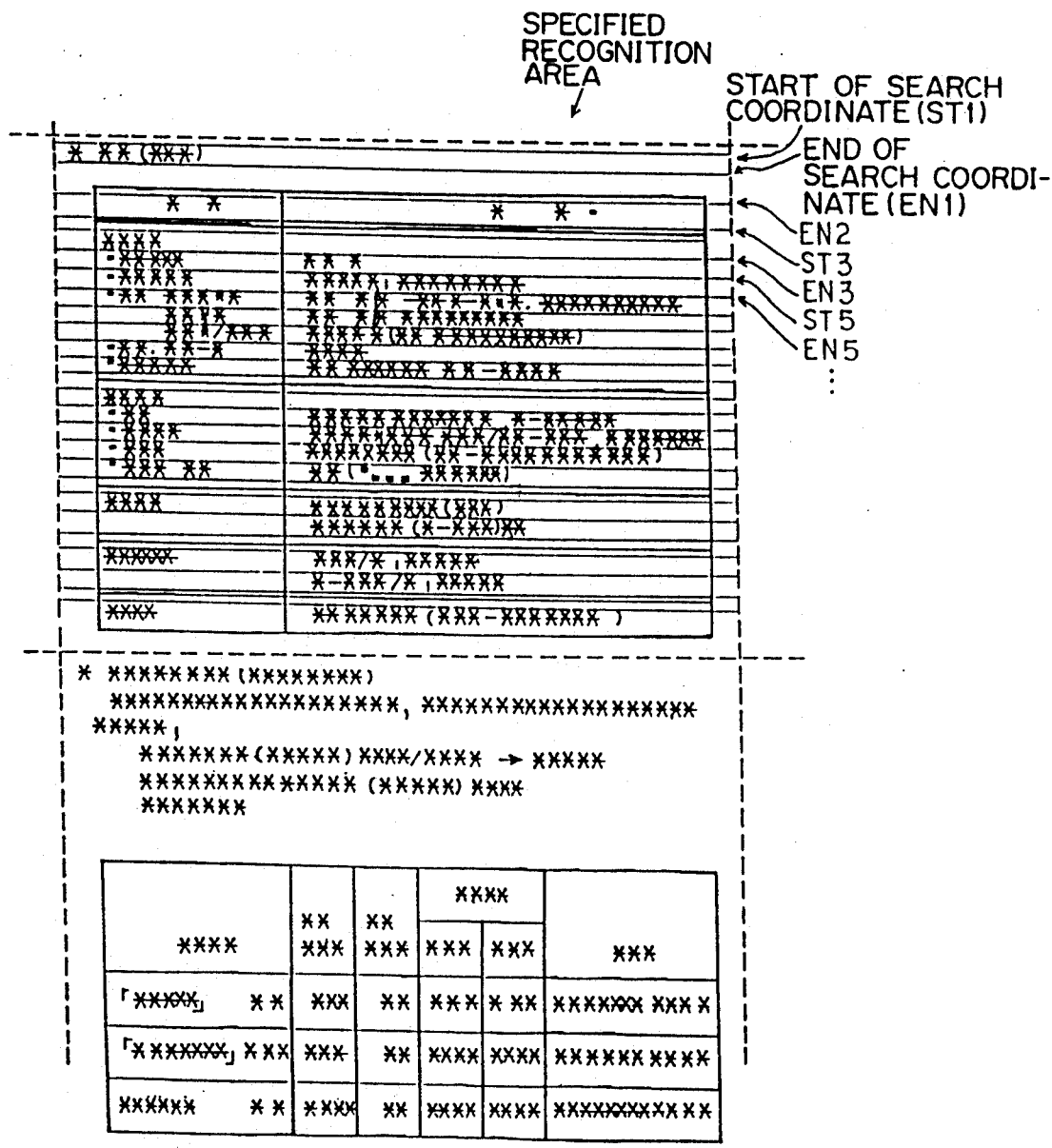
FIG. 19 is a view for explaining each coordinate.
Figure 20:
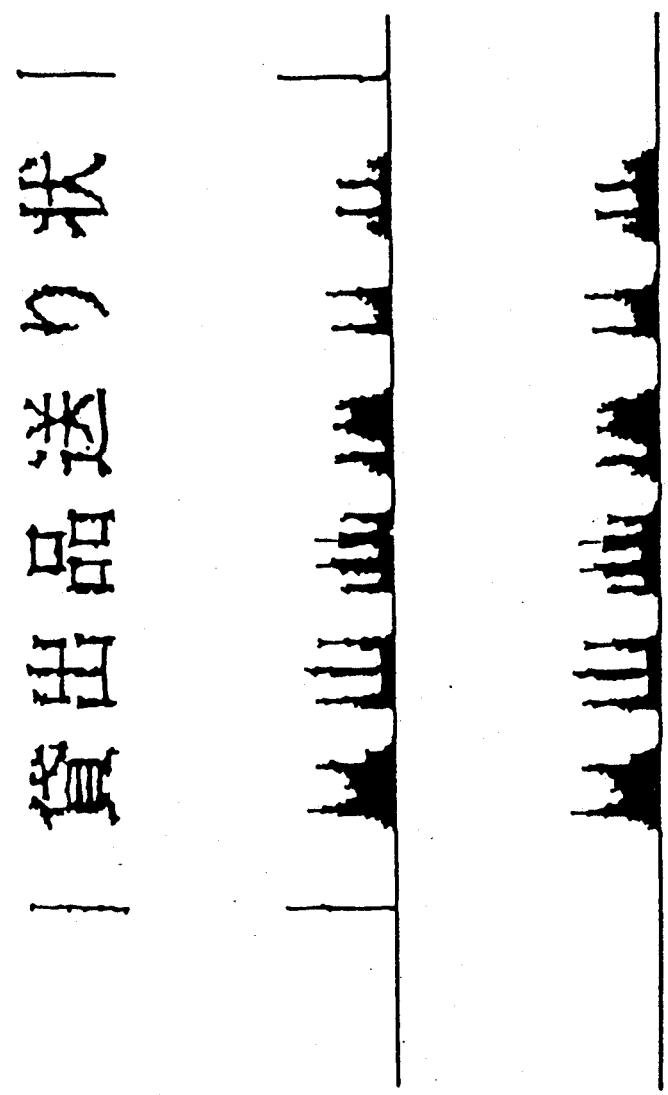
FIG. 20 shows a vertical histogram and a histogram after the vertical ruled line area has been eliminated.

First, the operator extracts frame lines (S43) within the range of an original image specified on the ¼ image using the personal computer, and then stores the coordinates of the original image of vertical and horizontal frame lines (the start coordinate and the end coordinate of vertical and horizontal lines). Next, a slant of a row is determined (S44). In determining a slant of a row, a calculation is performed to obtain the slant of a row according to the coordinates of a horizontal ruled line, thereby obtaining the average value of slants of all rows as the slant of the row. If no horizontal frame lines exist, an original image is split vertically into a plurality of strip areas as described in the first version of the this invention. Then each strip is searched horizontally from the top for the coordinates where white turns to black and black turns to white, thereby obtaining a slant of a row. (In this case, a strip comprising a vertical ruled line is removed from target strips of the slant detection operation.) In calculating a slant, a row-forming operation is considered (refer to FIG. 18). A row-forming process is started at the slant obtained by the process S44 from the top (TOP) of a recognition area (S45). If a horizontal ruled line exists, the row-forming process is performed skipping horizontal frame lines, that is, lines between horizontal frame lines. In the forming process (S45), the recognition area with the pre-determined slant value is searched from the left to the right margin. The searching operation starts from the start coordinate (the first coordinate that encounters a black picture element that is not a part of a vertical ruled line), proceeds downwards, and stops where the encountered black picture element belongs only to a vertical ruled line. The length from the start coordinate to the end coordinate in the searching operation is defined as one row to be extracted. That is, the start of search coordinate ST1 and the end of search coordinate EN1 is treated as one row. The end of search coordinate EN1 is also the start of the search coordinate of the next searching operation. Normally, the expression ENi=ST(i+1) is effective. A searching operation is terminated compulsorily where there is a horizontal ruled line and the ENi is assigned. The next start coordinate ST (i+1) is immediately below the horizontal ruled line. That is, an end coordinate and a start coordinate are determined simultaneously, as shown in FIG. 19. After the extraction of one row without a ruled line area, a character forming recognition process S46 is performed to obtain a vertical histogram of the present row. With this histogram, each character in the row is formed following the row formation, and a vertical ruled line is eliminated (refer to FIG. 20).

A vertical histogram is provided to the character former 10-2 after eliminating a vertical line. As a result of the character forming operation, the horizontal start and the end coordinates of a character are obtained and inputted to the recognizer 10-3 to generate a resultant character code. The character code and the horizontal start and end positions are stored in a memory.

A space is provided with a specific code by detecting the formed portion of a character. The number of space outputs is obtained by dividing the space by the average character width, and the coordinates are determined and provided. Then the recognition result is displayed. That is, the recognizing operation is repeated by the character forming recognition process and the result is displayed sequentially in rows on a personal computer (S47). In the case of a vertical ruled line, character codes for horizontal frame lines are displayed. The number of character codes to be displayed is proportional to the length of the line according to the coordinate information of the start and end positions of a vertical ruled line. The number of displayed codes depends on the length of a ruled line and the character width. The character width is the average value of characters in the preceding row. If the preceding row contains no characters, a default value is adopted. If a vertical ruled line exists in the display of horizontal frame lines, the vertical ruled line is displayed only for that portion (refer to FIG. 13). Characters are displayed sequentially starting from the smallest value of coordinates of characters and frame lines. Then the recognizing operation is checked to determine whether it covers all specified areas (S48). If it does not (N), the next row is formed (S49) and the process is reperformed from the character forming recognition process (S46). The next row forming process (S49) is similar to the row forming process (S45). The former is used to process a continuing row while the latter is used to process a leading row.

Figure 13:
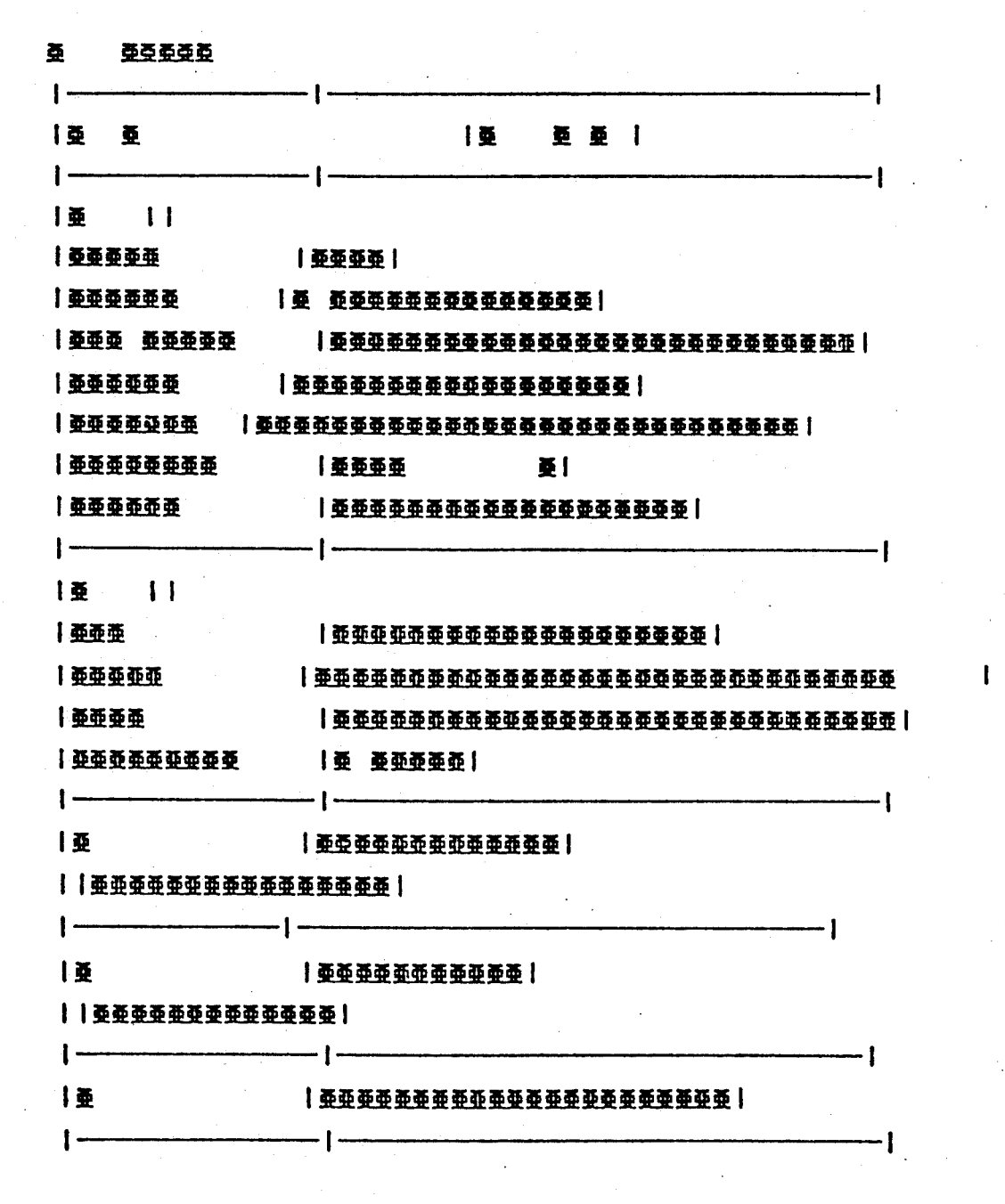

The operation described above is repeated for all frame lines and characters, and when the the whole operation is determined to be completed (Y) (S48), a ruled line forming process (S50) is performed. As shown in FIG. 13, the result of the processes (S46, S47) differs in the vertical ruled line if character unit, types of vertical and horizontal frame lines, and blanks are considered. That is, the vertical ruled line is not normally made straight. The ruled line forming process (S50) is used to correctly reform this erroneous vertical ruled line correctly. After recognizing all read data, the personal computer 11 reforms uneven frame lines, and displays the result (refer to FIG. 14).

The above detailed explanation of the this invention is based on one embodiment, but it can be extended. For example, ½ reduced layout images are displayed in this embodiment, but unreduced data can be displayed on a larger display unit. Furthermore, if a display unit has poor resolution, image data can be further reduced.

Figure 21:
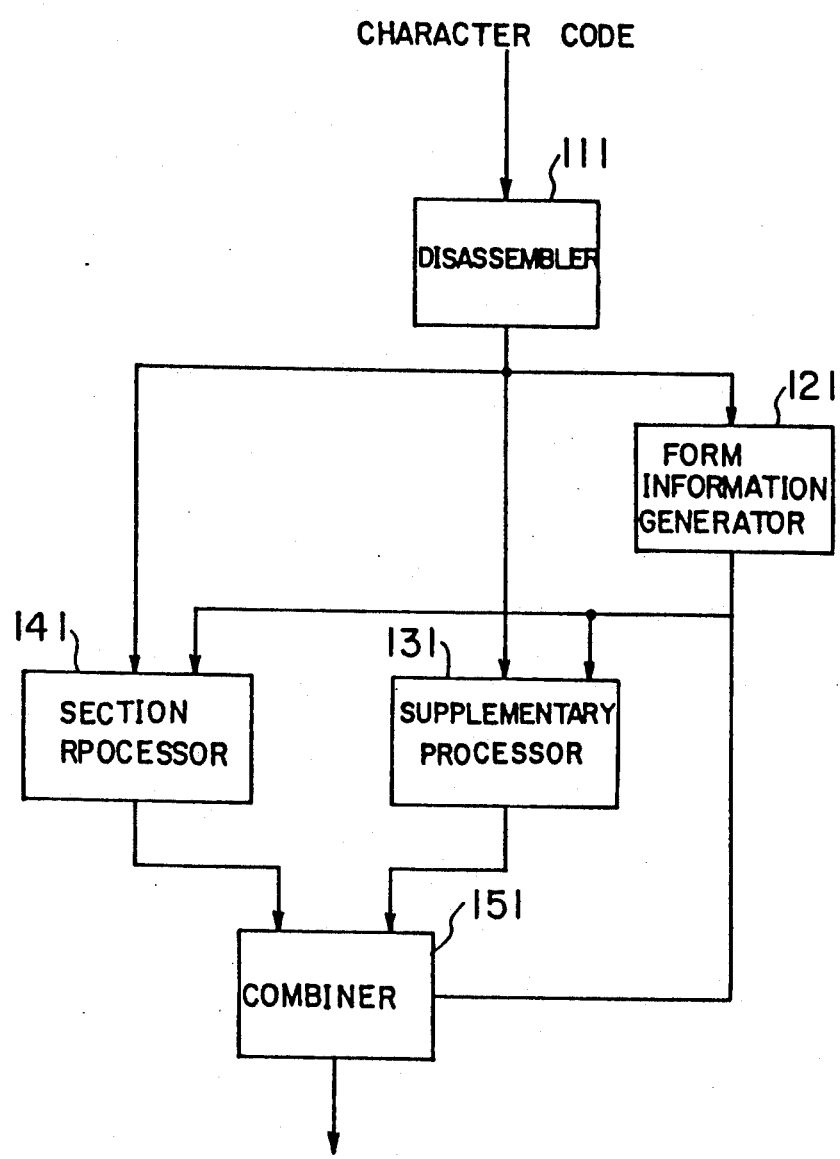
FIG. 21 is a block diagram of a system, for explaining the table forming method according to the third principle of this invention.

FIG. 21 is a block diagram of a device using a table forming method, according to the third principle of this invention.

In FIG. 21, a disassembler 111 reshapes a table according to a table reshaping method based on a series of character codes, such as characters, codes and ruled lines by detecting a delimiter indicating a column section for respective rows in a table from a series of inputted character codes. The disassembler 111 disassembles a series of character codes into delimiters and structural elements comprising character codes forming respective rows sectioned by the delimiters.

A form information generator 121 generates form information showing the numbers of rows and columns in a table and lengths of respective columns, based on the delimiters and structural elements dissembled by the disassembler 111.

A supplementary processor 131 judges whether or not respective structural elements comprise character codes indicating frame lines, and perform processes to supplement appropriate character codes based on the judging result and the form information generated by the form information generator 121.

A section processor 141 judges whether or not the respective structural elements corresponding to two columns sectioned by a delimiter comprise character codes indicating frame lines, and outputs the character codes representing predetermined frame lines corresponding to the judging results as the delimiters.

The section processor 141 generates predetermined delimiters so that the column numbers in respective rows are the same, when the numbers of delimiters outputted for respective rows are less than the column numbers indicated by the form information.

A combiner 151 combines the delimiters outputted from the section processor 141 and the supplementary processing results for the respective columns produced by the supplementary processor 131, based on the form information.

To summarize, the disassembler 111 detects delimiters showing the column sections for respective rows in a table from a series of character codes, such as characters, codes and frame lines forming the table, and disassembles the above series of character codes into the delimiters and the structural elements comprising character codes forming respective columns sectioned by these delimiters. A structural element comprises e.g. at least one character code between two delimiters. The form information generator 121 generates form information such as the numbers of rows and columns in a table and lengths of respective columns.

The supplementary processor 131 judges whether or not the above described structural elements comprise character codes indicating frame lines, and supplements predetermined character codes based on the judging results and the above described form information.

The section processor 141 judges whether or not the respective structural elements corresponding to the two columns sectioned by a delimiter comprise character codes indicating frame lines. The character codes showing predetermined ruled line patterns corresponding to the judging results are outputted as the delimiters.

The combiner 151 combines the delimiters outputted from the section processor 141 and the supplementary processing results for the respective columns obtained from the supplementary processor 131 to be outputted as character codes showing a reshaped table.

The supplementary processor 131 judges whether or not the respective structural elements comprise character codes indicating frame lines, and outputs the frame lines of a length shown by form information for respective columns in respective rows. Thus, it becomes possible to reshape tables of various forms, including a table that has a character or a code mixed with a ruled line in a row.

Also at this time, if the section processor 141 outputs character codes representing frame corners showing the connections between the horizontal frame lines and the vertical frame lines showing the column sections, since they can be connected with a horizontal ruled line included in the earlier or structural elements, reshaped tables have better qualities.

Meanwhile, when the numbers of delimiters for the respective rows outputted from the section processor 141 are less than the numbers of columns indicated by the above described form information, the section processor 141 generates and outputs predetermined delimiters.

That is, since the section processor 141 outputs a number of delimiters indicatied by form information for respective rows, tables having different numbers in the respective columns can be reshaped. Thus, various forms of tables can be handled.

Figure 22:
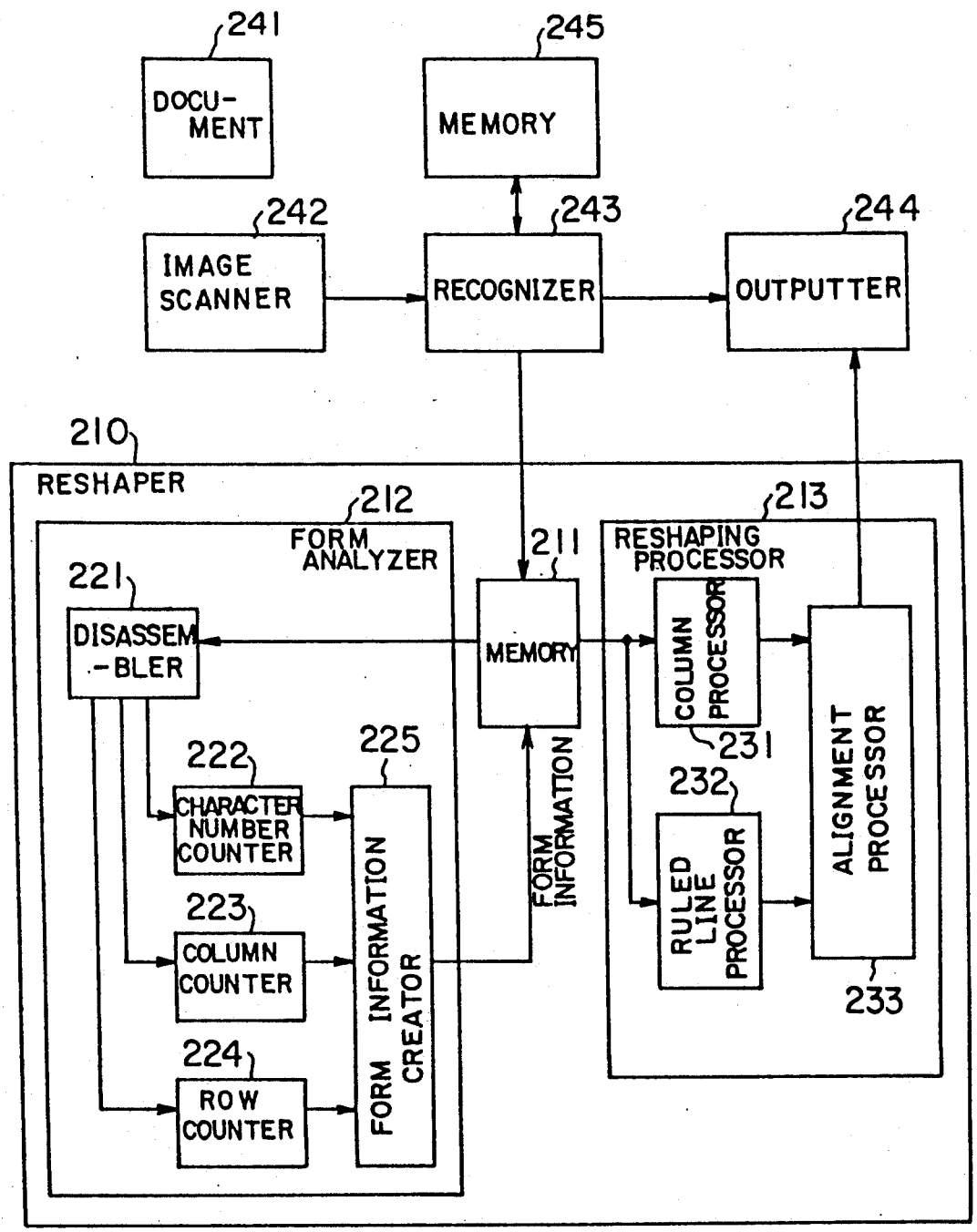
FIG. 22 shows a block diagram of a type recognition system applied with the table reshaping method according to the third principle of this invention.

FIG. 22 shows a block diagram of a type recognition system applied with the table reshaping method according to the third principle of this invention.

The correspondence between the principal diagram shown in FIG. 21 and the block diagram of the recognition system shown in FIG. 22 is as follows:

The disassembler 111 corresponds to the disassembler 221.

The form information generator 121 corresponds to a character number counter 222, a column counter 223, a row counter 224 and a form information creator 225.

The supplementary processor 131 corresponds to a column processor 231.

The section processor 141 corresponds to a ruled line processor 232.

The combiner 151 corresponds to an alignment processor 233.

The type recognition system shown in FIG. 22 comprises an image scanner 242 for reading a document 241; a recognizer 243 for converting the characters, codes and frame lines recognized from the images read by the image scanner 242 into character codes; a reshaper 210 for reshaping the table format by reshaping the frame lines in the table obtained as a result of recognition by the recognizer 243; and an outputter (e.g. a printer) 244 for outputting the recognition results obtained by the recognizer 243 and the reshaping results obtained by the reshaper 210.

The recognition results obtained by the recognizer 243 are stored in a memory 245, such as a disk. When document 241 contains a table, the recognizer 243 reads the part relating to the table from the recognition results stored in the memory 245 and supplies that part to the reshaper 210.

Figures 23, 27, 28:
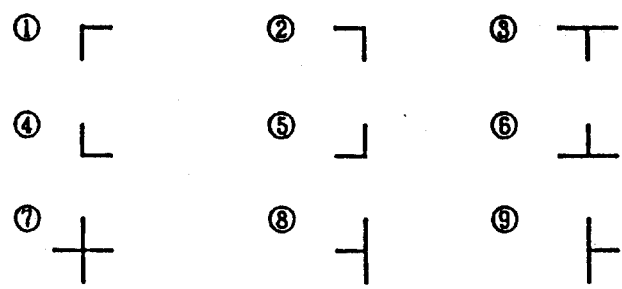
FIG. 23 shows an example of a part relating to a table included in the recognition results obtained by a recognizer.
FIG. 27 explains the reshaping results obtained by the ruled line processor.
FIG. 28 shows an example of a result obtained by a reshaping process.

FIG. 23 shows an example of the part relating to a table included in the recognition results obtained by the recognizer 243.

In FIG. 23, a sign "—" indicates a horizontal ruled line and a sign "|" indicates a vertical ruled line, which indicates a section between columns in a table. The ends of respective rows are indicated e.g. by a carriage return (CR).

The following is a description of the structure and operation of the reshaper 210.

The reshaper 210 comprises a memory 211 for storing the recognition result supplied by the recognizer 243, a format analyzer 212 for generating form information such as the numbers of columns and rows in a table and lengths of respective columns, and a reshaping processor 213 for creating a table in the format shown by the above described form information.

The form analyzer 212 comprises the disassembler 221 for detecting a CR indicating the end of a line and a vertical ruled line included in the respective rows obtained from the above recognition operation and for disassembling the character codes included in the respective rows into structural elements in a table, a character number counter 222 for counting the numbers of characters included in respective structural elements of the table dissembled by the disassembler 221, a column counter 223 for counting the number of columns included in respective rows, a row column 224 for counting the number of rows included in the recognition result supplied by the recognizer 243, a form information creator 255 for creating form information comprising a column number N in the table, a character number Mi (where i is an integer from 1 to N) assigned to the respective columns, and a row number L in the table.

The disassembler 221 inserts a series of character codes between a head end and a tail end of a row and a vertical ruled line or between two vertical frame-line structural elements in the table.

In the initial state, the form information creator 225 compares the count value of the column counter 223 with the column number N (STEP 401), each time the disassembler 221 detects a vertical ruled line (STEP 401). When the count value is larger than the column number N (when judgment in STEP 402 is affirmative) it is set to the column number N (STEP 403). When the judgment in STEP 402 is negative, the column number N does not change.

Figure 24:
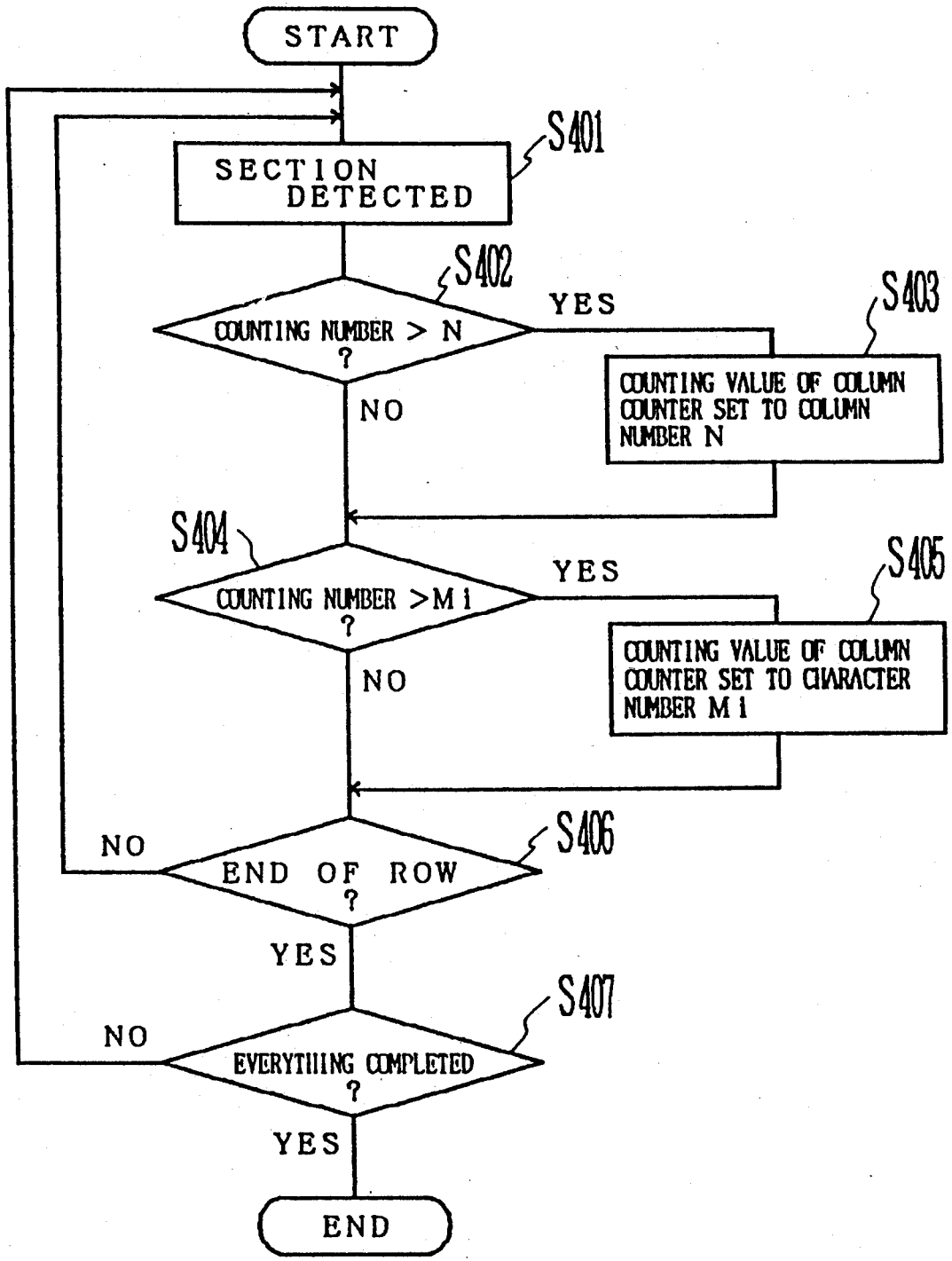
FIG. 24 is a flowchart showing actions of a form analyzer.

FIG. 24 is a flowchart showing the actions of the form analyzer 212 used in the present embodiment.

The form information creator 225 compares the count value of the character number counter 222 with the character number Mi of the column indicated by the count value of the column counter 223 (STEP 404). When the count value of the character number counter is greater than the above described character number Mi (when the judgment in STEP 404 is affirmative), it is set to the character number Mi of the column corresponding to the count value. Meanwhile, in case of a negative judgment in STEP 404, character number Mi of the corresponding column does not change.

The form information creator 225 repeats STEP 401 through STEP 405, until the judgment in STEP 406 becomes affirmative. STEPs 401 through 406 are repeated, until all processings for the recognition results supplied from the recognizer 203 are concluded in STEP 407.

As such, the maximum number of structural elements included in the respective rows and the maximum number of character codes included in the structural elements corresponding to respective columns are obtained as the column number N in the table and the character number Mi in respective columns. The count value of the column counter 224 is set as the column number L in the table.

For instance, by performing STEPs 401 through 407 for the recognition results shown in FIG. 23, the column number "4" in the table the row number "5" in the table, and the character numbers "3", "5", "2" and "4" in respective columns 1 through 4 are obtained.

Thus, the form information creator 225 creates form information and stores the result in the memory 221.

Also, the character number counter 222 can be set to calculate the number of character codes other than those representing frame lines included in the respective structural elements. In this case, since number of characters in respective columns is determined based only on the structural elements including a character code showing a character, even when a vertical ruled line showing the section of the respective columns in the first row is not recognized, the number of frame lines included in the first row does not match the number of characters in the first column.

The reshaper 213 comprises a column processor 231 for supplementarily processing the respective structural elements stored in the above described memory 211, a ruled line processor 232 for reshaping the respective vertical lines stored in the memory 211, and an alignment processor 233 for aligning the processing results of the column processor 231 and the frame lines 232 according to the above described form information.

Figure 25:
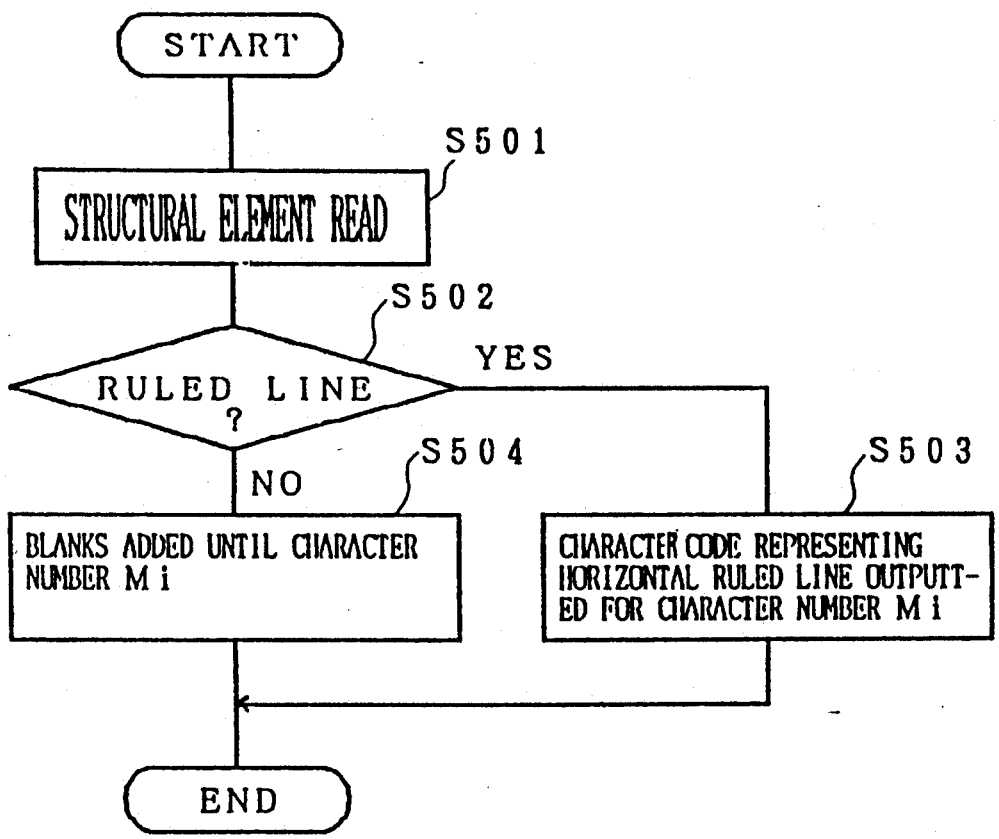
FIG. 25 is a flowchart indicating supplementary actions by a column processor.

FIG. 25 is a flowchart indicating supplementary actions by the column processor 231.

The column processor 231 sequentially reads the structural elements stored in the memory 211 (STEP 501) and the character number Mi corresponding to the read structural elements.

Then it judges whether or not the structural elements read in STEP 501 indicate a ruled line (STEP 502). If it judges affirmatively, it outputs the character codes for the horizontal frame lines indicated by the character number Mi in the above described column (STEP 503). If it judges negatively, it adds e.g. character codes indicating blanks to the above described structural elements (STEP 504).

Thus, the column processor 231 sets the numbers of the characters in the respective structural elements to the character number Mi of the corresponding columns, and the processing results are supplied to the alignment processor 233.

Figure 26:
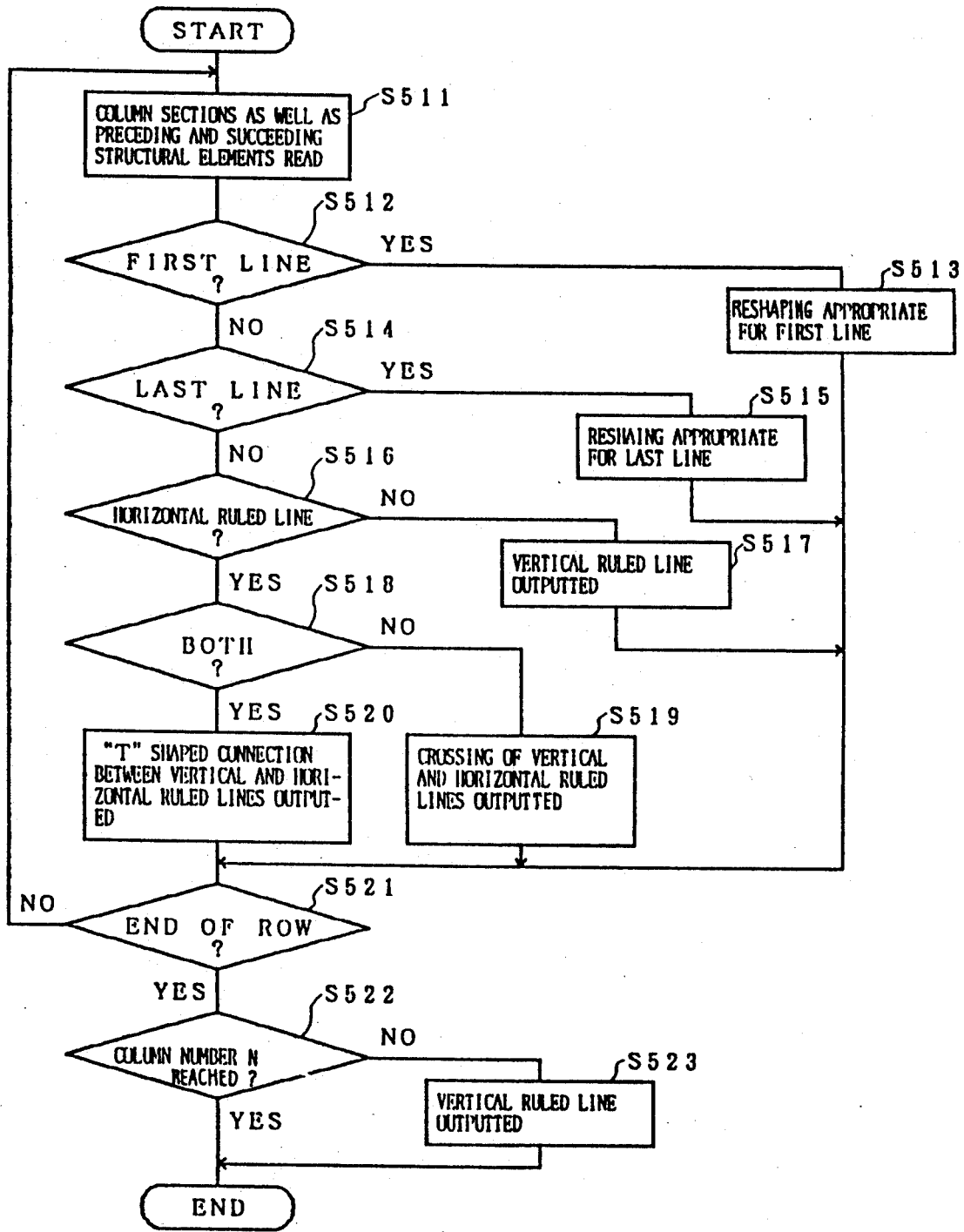
FIG. 26 is a flowchart illustrating reshaping actions performed by a ruled line processor.

FIG. 26 is a flowchart illustrating the reshaping actions performed by the ruled line processor 232.

FIG. 27 explains the reshaping results obtained by the ruled line processor 232.

The ruled line processor 232 sequentially selects the character codes indicating vertical frame lines stored in the memory 211 and reads the structural elements stored preceding and succeeding such character codes (STEP 511). More specifically, only the structural elements after a vertical ruled line are read for the vertical ruled line at the head end of a row and only the structural elements before a vertical ruled line are read for the vertical ruled line at the tail end.

When the vertical frame lines included in the first row are read in STEP 511, the judgment in STEP 512 is affirmative, in which case the ruled line processor 232 properly reshapes the first column (STEP 513). For instance, if the read vertical ruled line is at the head end of a row, the outputted character code indicates a stroke comprising two wings with each wing extending to the right and to the bottom connected at the top left corner. (Refer to [1] in FIG. 27.) If it is at the tail end of a row, the outputted character code indicates a stroke comprising two wings with each wing extending to the left and to the bottom connected at the top right corner. (Refer to [2] in FIG. 27.) If it is at a middle of a row, the outputted character code indicates a "T"-shaped connection between a vertical ruled line and a horizontal ruled line. (Refer to [3] in FIG. 27.)

When a vertical line included in the last row is read in STEP 511, the judgment in STEP 514 is affirmative, in which case the ruled line processor 232 properly reshapes the last row (STEP 515). For instance, when the vertical column line is at the head end of a row, the outputted character code indicates a stroke comprising two wings with each wing extending to the right and to the top connected at the bottom left corner. (Refer to [4] in FIG. 27.) If it is at the tail end of a row, teh outputted character code indicates a stroke comprising two wings with each wing extending to the left and to the top connected at the bottom right corner. (Refer to [5] in FIG. 27.) If it is at a middle of a row, outputted is the character code indicates an inverted "T" shaped connection between a vertical ruled line and a horizontal ruled line. (Refer to [6] FIG. 27.)

Meanwhile, when the judgments in STEPS 512 and 514 are negative, the ruled line processor 232 judges whether or not either of the structural elements before and after a vertical ruled line contains a character code indicating a horizontal ruled line (STEP 516). When the judgment in STEP 516 is negative, the read character code indicating a vertical ruled line is outputted "as is" (STEP 517). When the vertical ruled line read in STEP 511 corresponds to the head end or tail end of a row, the character code indicating a corresponding vertical ruled line is outputted "as is", as in STEP 517.

Meanwhile, when the judgment in STEP 516 is affirmative, the ruled line processor 232 judges whether or not both of the above described structural elements contain character codes indicating horizontal frame lines (STEP 518). If the judgment is affirmative, the outputted character code indicates a crossing of a vertical stroke and a horizontal stroke (STEP 519). (Refer to [7] in FIG. 27.) If the judgment in STEP 518 is negative, the outputted character code indicates a ninety (90) degree clockwise (counterclockwise) rotated "T"-shaped connection between a vertical ruled line and a horizontal ruled line (STEP 520) when the structural elements before (after) a frame vertical ruled line include a character code indicating a horizontal ruled line. (Refer to [8] (([9])) in FIG. 27.)

The ruled line processor 232 repeats STEP 511 through STEP 520 until all vertical frame lines stored in the memory 211 corresponding to the respective rows are read (an affirmative judgment in STEP 521). In case of an affirmative judgment in STEP 521, the ruled line processor 232 judges whether or not the numbers of the vertical frame lines outputted for the respective rows reach the above described column number N (STEP 522). If the judgment in STEP 522 is negative, the ruled line processor 232 outputs vertical frame lines as in STEP 517, until the numbers are equal to the column number N (STEP 523).

Thus, the ruled line processor 232 reshapes the respective vertical column lines depending on the structural elements before and after a horizontal ruled line. As such, when the structural elements before or after a vertical ruled line contain a horizontal ruled line, the horizontal ruled line can be connected with one of the above described connections between a vertical ruled line and a horizontal line, and the quality of a reshaped table is improved.

The processing results are supplied to the alignment processor 233, which sequentially inserts these processing results between the respective structural elements supplied by the column processor 231 to restore a table. That is, the column processor 231 and ruled line processor 232 sequentially act to reshape a table inputted from the recognizer 243.

As stated earlier, the column processor 231 performs supplementary processings for the structural elements corresponding to the respective row, depending on whether or not the respective structural elements contain a horizontal ruled line, and the ruled line processor 232 performs reshaping processes for the respective vertical frame lines depending on the structural elements before or after a vertical ruled line.

Accordingly, as shown in FIG. 23, a table mixed with a character and a horizontal ruled line in a row are reshaped properly, and the horizontal frame lines included in the structural elements before or after a vertical ruled line are connected to vertical frame lines indicating sections, so that the quality of a reshaped table is bettered.

Since the ruled line processor 232 supplements vertical frame lines until their numbers become equal to the number of columns shown in the form information, a table whose numbers of columns differs for the respective rows is reshaped.

To reiterate, the column processor 231 supplements structural elements corresponding to respective columns depending on whether or not the respective structural elements contain horizontal frame lines, and the ruled line processor 232 reshapes respective vertical frame lines depending on the preceding or succeeding structural elements.

Hence, as shown in FIG. 23, even a table containing a character mixed with a horizontal ruled line is reshaped properly, and the horizontal frame lines included in the preceding and succeeding structural elements are connected to the vertical frame lines indicating sections, so that the quality of a reshaped table is improved.

The ruled line processor 232 supplements vertical frame lines until their number equals the number of columns indicated by the form information by performing STEPs 522 and 523. Thus, a reshaping operation is performed in accordance with a table in which the number of columns differs depending on a row. Even if vertical frame lines which are a part of a frame showing an outline of a table are not included in the recognition result, a table can be reshaped with vertical frame lines added.

Whereas the above described embodiment of this invention describes its application to a document creation type recognition system, it is applicable to reshaping a table based on a character code inputted by an inputting means provided in a document creator. In this case, since there is no need to set up a format, an address directory can be easily created.

A delimiter is not limited to a vertical ruled line "|" shown in FIG. 3 only. Instead it can be anything that can indicate a section between columns in the respective rows, such as a comma "," or a slash "/".

Further, the correspondence between the principal system shown in FIG. 21 and an exemplified embodiment is not restricted to that indicated earlier between the diagram shown in FIG. 21 and this embodiment. Those in the same business can easily assume many variations in the applications of this invention.

According to the first and second principles of this invention, a horizontal ruled line detector can easily extract a character region and a ruled line region from an image (a document) mixed with a ruled line and a character. Thus, faster recognition speed is realized.

Character coding of all recognition results realizes a simpler recognizer by expressing recognized characters and frame lines in character codes.

By turning frame lines into character codes, generic software can easily handle the output results.

According to the third principle of this invention, since the supplementary processor supplements character codes representing sections depending on whether or not the respective structural elements comprise character codes indicating a vertical ruled line, various forms of tables are reshaped. Such a reshaped table is made to a higher quality by having a section processor output delimiters corresponding to the preceding and succeeding structural elements.

Further, since the section processor outputs the number of delimiters indicated by the form information for respective rows, even a table whose column numbers in respective row differ. Consequently, various forms of tables can be processed.

What is claimed is:

1. A character recognition device for recognizing printed characters of images including ruled lines, the device comprising:
   a strip forming means for creating a plurality of processing sectors in a strip form extending in a vertical direction for an image to be recognized;
   a region detecting means for detecting a region representing a row by determining an upper limit and lower limit of one of a character region and a ruled line region in the respective processing sectors;
   a horizontal ruled line detecting means for judging whether or not a region representing a row in the respective processing sectors detected by the region detecting means comprises a horizontal ruled line in a series of characters;
   a vertical ruled line detecting means for detecting existence of a vertical ruled line in said respective processing sectors; and
   a character recognizing means for recognizing said series of characters in said region representing said row judged as character series by said horizontal ruled line detecting means, wherein
   said vertical ruled line detecting means is constructed to detect regions with vertically extending consecutive black picture elements in said respective processing sectors, calculate vertical histograms in the respective regions, and by judging a difference between the vertical historgrams identify whether or not the respective regions represent vertical frame lines,
   said vertical ruled line detecting means being constructed also to eliminate effects caused by broken frame lines by further vertically searching existence of vertical frame lines from end points of the respective regions in said respective processing sectors.

2. The character recognition device according to claim 1, wherein:
   said vertical ruled line detecting means is constructed to adaptively change a further vertically searched area from end points of said respective regions, depending on whether or not said respective regions represent vertical ruled line regions.

3. The character recognition device according to claim 1, wherein:
   said vertical ruled line detecting means is constructed to identify said respective regions as vertical ruled line regions, even when said respective regions are not identified as vertical ruled line regions, if there is a peak of the vertical histograms calculated for said respective regions near a position of the vertical ruled line of a preceding row.

4. The character recognition device according to claim 1, further comprising:
   a coding means for converting characters recognized by said character recognizing means into character codes, as well as vertical frame lines and horizontal frame lines detected respectively by said vertical ruled line detecting means and said horizontal line detecting means into ruled line codes, and for outputting said character codes mixed with said ruled line codes as recognition results.

5. A character recognition device for recognizing printed characters of images including ruled lines, the device comprising:
   a strip forming means for creating a plurality of processing sectors in a strip form extending in a vertical direction for an image to be recognized;
   a region detecting means for detecting a region representing a row by determining an upper limit and lower limit of one of a character region and a ruled line region in the respective processing sectors;
   a horizontal ruled line detecting means for judging whether or not a region representing a row in the respective processing sectors detected by the region detecting means comprises a horizontal ruled line in a series of characters;
   a vertical ruled line detecting means for detecting existence of a vertical ruled line in said respective processing sectors;

a character recognizing means for recognizing said series of characters in said region representing said row judged as character series by said horizontal ruled line detecting means; and a coding means for converting characters recognized by said character recognizing means into character codes, as well as vertical frame lines and horizontal frame lines detected respectively by said vertical ruled line detecting means and said horizontal ruled line detecting means into ruled line codes, and for outputting said character codes mixed with said ruled line codes as recognition results.

* * * * *